(12) United States Patent
Sumasu et al.

(10) Patent No.: US 10,560,046 B2
(45) Date of Patent: Feb. 11, 2020

(54) MOTOR CONTROL DEVICE

(71) Applicant: JTEKT CORPORATION, Osaka-shi, Osaka (JP)

(72) Inventors: Hiroshi Sumasu, Kashihara (JP); Hiroshi Kitamoto, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/185,856

(22) Filed: Nov. 9, 2018

(65) Prior Publication Data
US 2019/0149078 A1 May 16, 2019

(30) Foreign Application Priority Data
Nov. 16, 2017 (JP) ................................. 2017-220994

(51) Int. Cl.
*B62D 5/04* (2006.01)
*H02P 27/08* (2006.01)
*H02P 21/22* (2016.01)
*H02M 1/44* (2007.01)
*H02P 21/00* (2016.01)

(52) U.S. Cl.
CPC ............... *H02P 27/08* (2013.01); *B62D 5/04* (2013.01); *B62D 5/0463* (2013.01); *H02M 1/44* (2013.01); *H02P 21/00* (2013.01); *H02P 21/22* (2016.02); *B62D 5/0409* (2013.01)

(58) Field of Classification Search
CPC ................................. H02P 21/00; H02P 27/00
See application file for complete search history.

(56) References Cited

U.S. PATENT DOCUMENTS

| 9,214,886 | B2* | 12/2015 | Suzuki | .................... H02P 21/12 |
| 9,571,017 | B2* | 2/2017 | Hirotani | .................. H02P 25/22 |
| 9,673,747 | B2* | 6/2017 | Nakamura | ............ H02P 27/085 |
| 9,780,712 | B2* | 10/2017 | Mori | ....................... H02P 21/22 |
| 9,979,340 | B2* | 5/2018 | Suzuki | .................... H02P 21/20 |
| 2012/0049782 | A1* | 3/2012 | Suzuki | .................... H02M 1/14 |
| | | | | 318/807 |

FOREIGN PATENT DOCUMENTS

| EP | 2506414 A1 | 10/2012 |
| EP | 3232556 A1 | 10/2017 |
| EP | 3297155 A1 | 3/2018 |
| JP | S-64-50766 A | 2/1989 |

OTHER PUBLICATIONS

Mar. 14, 2019 Extended Search Report issued in European Patent Application No. 18206495.6.

* cited by examiner

*Primary Examiner* — Bentsu Ro
(74) *Attorney, Agent, or Firm* — Oliff PLC

(57) ABSTRACT

A first PWM count computation unit computes a first PWM count for each of three phases in a first system. A second PWM count computation unit computes a second PWM count for each of three phases in a second system. Upper and lower switching elements for each phase in the first system are controlled in accordance with a first pattern in which the upper and lower switching elements are varied in the order of an upper on state, a lower on state, and the upper on state from the time of start of PWM cycles. Upper and lower switching elements for each phase in the second system are controlled in accordance with a second pattern in which the upper and lower switching elements are varied in the order of a lower on state, an upper on state, and the lower on state from the time of start of PWM cycles.

6 Claims, 13 Drawing Sheets

FIG. 11A

| CYCLE NUMBER i | 1 | 2 | 3 | 4 | 5 | 6 | 7 | 8 | 9 | 10 | TOTAL |
|---|---|---|---|---|---|---|---|---|---|---|---|
| $Cu_{1C}$ SET IN S1 | 400 | 400 | 400 | 400 | 400 | 400 | 400 | 400 | 400 | 400 | 4000 |
| $Cv_{1C}$ SET IN S1 | 200 | 200 | 200 | 200 | 200 | 200 | 200 | 200 | 200 | 200 | 2000 |
| $Cw_{1C}$ SET IN S1 | 100 | 100 | 100 | 100 | 100 | 100 | 100 | 100 | 100 | 100 | 1000 |
| $Cu_{2C}$ SET IN S2 | 400 | 400 | 400 | 400 | 400 | 400 | 400 | 400 | 400 | 400 | 4000 |
| $Cv_{2C}$ SET IN S2 | 200 | 200 | 200 | 200 | 200 | 200 | 200 | 200 | 200 | 200 | 2000 |
| $Cw_{2C}$ SET IN S2 | 100 | 100 | 100 | 100 | 100 | 100 | 100 | 100 | 100 | 100 | 1000 |

FIG. 11B

| CYCLE NUMBER i | 1 | 2 | 3 | 4 | 5 | 6 | 7 | 8 | 9 | 10 | TOTAL |
|---|---|---|---|---|---|---|---|---|---|---|---|
| $Cu_1$ SET IN S3 | 400 | 400 | 400 | 400 | 400 | 400 | 400 | 400 | 400 | 400 | 4000 |
| $Cv_1$ SET IN S3 | 190 | 190 | 190 | 190 | 190 | 190 | 190 | 190 | 190 | 190 | 1900 |
| $Cw_1$ SET IN S3 | 90 | 90 | 90 | 90 | 90 | 90 | 90 | 90 | 90 | 90 | 900 |
| $Cu_2$ SET IN S3 | 410 | 410 | 410 | 410 | 410 | 410 | 410 | 410 | 410 | 410 | 4100 |
| $Cv_2$ SET IN S3 | 200 | 200 | 200 | 200 | 200 | 200 | 200 | 200 | 200 | 200 | 2000 |
| $Cw_2$ SET IN S3 | 100 | 100 | 100 | 100 | 100 | 100 | 100 | 100 | 100 | 100 | 1900 |

MOTOR CONTROL DEVICE

INCORPORATION BY REFERENCE

The disclosure of Japanese Patent Application No. 2017-220994 filed Nov. 16, 2017 including the specification, drawings and abstract, is incorporated herein by reference in its entirety.

BACKGROUND OF THE INVENTION

1. Field of the Invention

The present invention relates to a motor control device that controls an electric motor that has three-phase motor coils in two systems with a phase difference of 60 degrees, 180 degrees, or 300 degrees therebetween via a first drive circuit that drives three-phase motor coils in a first system, which is one of the two systems, and a second drive circuit that drives three-phase motor coils in a second system, which is the other system, the first drive circuit and the second drive circuit each having sets of upper and lower switching elements for three phases.

2. Description of the Related Art

In a motor control device that performs vector control on a three-phase electric motor, two-phase current command values are computed in each current control cycle. Two-phase voltage command values are computed on the basis of the deviation between the two-phase current command values and detected two-phase current values. The two-phase voltage command values are subjected to a two-phase/three-phase conversion performed using the rotational angle of the electric motor. Consequently, phase voltage command values (three-phase voltage command values) for U-phase, V-phase, and W-phase are computed. Then, a U-phase PWM signal, a V-phase PWM signal, and a W-phase PWM signal with a duty corresponding to the respective phase voltage command values for U-phase, V-phase, and W-phase are generated, and supplied to a three-phase inverter circuit.

Six switching elements that constitute the three-phase inverter circuit are controlled in accordance with the U-phase PWM signal, the V-phase PWM signal, and the W-phase PWM signal. Consequently, a voltage corresponding to the three-phase voltage command values is applied to the three-phase electric motor. Consequently, a motor current that flows through the three-phase electric motor is controlled so as to be equal to the two-phase current command values. In such a motor control device, a current flows through a stray capacitance that is present between the three-phase electric motor and a frame ground at the time of rise and the time of fall of output voltages (phase voltages) for various phases in each PWM cycle. (See Japanese Patent Application Publication No. 1-50766 (JP 1-50766 A).)

Since this current flows through the frame ground, noise is occasionally radiated from the frame ground. In the case where the motor control device is mounted on an electric power steering (EPS) system mounted on a vehicle, long positive and negative power supply lines extend from a vehicle power source (battery) to the EPS. Therefore, a noise current that flows through the frame ground intrudes into the positive and negative power supply lines in the vicinity of the vehicle power source through the stray capacitance which is formed between the positive and negative power supply lines and the frame ground. Then, the noise current flows through the long positive and negative power supply lines to radiate noise from the lines. Consequently, common mode noise is generated.

There is known a motor control device that controls a three-phase electric motor (two-system motor) that has two-system three-phase motor coils using two-system drive circuits that supply power to the respective two-system three-phase motor coils. In such a motor control device that controls the two-system motor, a current flows through a stray capacitance that is present between the three-phase electric motor and a frame ground at the time of rise and the time of fall of output voltages (phase voltages) for various phases in each PWM cycle for each of the two-system drive circuits. Therefore, in the case where the two-system motor is controlled, the frequency of generation of common mode noise is high compared to a case where drive of a three-phase electric motor (one-system motor) that has a one-system three-phase motor coil is controlled.

SUMMARY OF THE INVENTION

An object of the present invention is to provide a motor control device that is capable of reducing common mode noise.

An aspect of the present invention provides a motor control device that controls an electric motor that has three-phase motor coils in two systems with a phase difference of 60 degrees, 180 degrees, or 300 degrees between the two systems via a first drive circuit that drives three-phase motor coils in a first system, which is one of the two systems, and a second drive circuit that drives three-phase motor coils in a second system, which is the other system, the first drive circuit and the second drive circuit each having sets of upper and lower switching elements for three phases, the motor control device including: a setting unit that sets a two-phase current command value corresponding to a target current value for a current that is to flow through the electric motor; an actual current value computation unit that computes an actual two-phase current value that matches a current that flows through the electric motor; a first PWM count computation unit that computes a first PWM count for each of three phases in the first system in each PWM cycle on the basis of the two-phase current command value and the actual two-phase current value; and a second PWM count computation unit that computes a second PWM count for each of three phases in the second system in each PWM cycle in accordance with the phase difference on the basis of the first PWM count for each of the three phases in the first system, in which the upper and lower switching elements for each phase in one of the first system and the second system are controlled in accordance with a first pattern in which the upper and lower switching elements are varied in an order of an upper on state, a lower on state, and the upper on state from a time of start of PWM cycles, and the upper and lower switching elements for each phase in the other system are controlled in accordance with a second pattern in which the upper and lower switching elements are varied in an order of a lower on state, an upper on state, and the lower on state from a time of start of PWM cycles.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 11A is a schematic table illustrating an example of PWM counts corresponding to phase voltages in each PWM cycle for each phase in each system set in steps S1 and S2;

FIG. 11B is a schematic table illustrating an example of PWM counts for FET control in each PWM cycle for each phase in each system set in step S3;

DETAILED DESCRIPTION OF EMBODIMENTS

Figure 1:
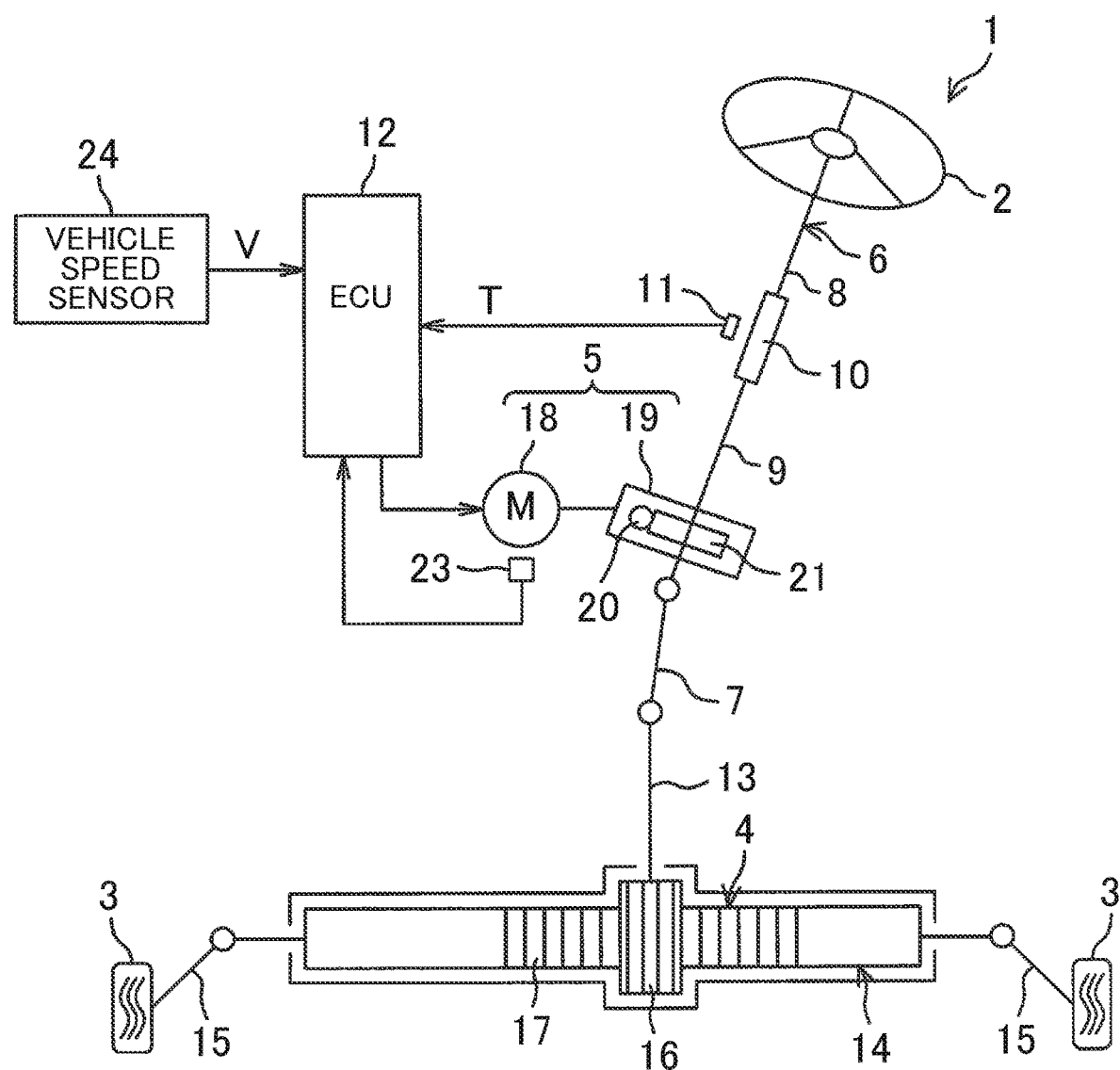
FIG. 1 is a schematic diagram illustrating a schematic configuration of an electric power steering system to which a motor control device according to an embodiment of the present invention is applied.

An embodiment in which the present invention is applied to an electric power steering system will be described in detail below with reference to the accompanying drawings. FIG. 1 is a schematic diagram illustrating a schematic configuration of an electric power steering system to which a motor control device according to an embodiment of the present invention is applied. An electric power steering (EPS) system 1 includes a steering wheel 2, a steering operation mechanism 4, and a steering assist mechanism 5.

The steering wheel 2 is a steering member configured to steer the vehicle. The steering operation mechanism 4 steers steered wheels 3 in conjunction with rotation of the steering wheel 2. The steering assist mechanism 5 assists a driver in steering. The steering wheel 2 and the steering operation mechanism 4 are mechanically coupled to each other via a steering shaft 6 and an intermediate shaft 7.

The steering shaft 6 includes an input shaft 8 coupled to the steering wheel 2, and an output shaft 9 coupled to the intermediate shaft 7. The input shaft 8 and the output shaft 9 are coupled so as to be rotatable relative to each other via a torsion bar 10. A torque sensor 11 is disposed in the vicinity of the torsion bar 10. The torque sensor 11 detects steering torque T applied to the steering wheel 2 on the basis of the amount of relative rotational displacement between the input shaft 8 and the output shaft 9. In the embodiment, the steering torque T which is detected by the torque sensor 11 is detected as a positive value when the vehicle is steered to the right, and as a negative value when the vehicle is steered to the left, for example, and the magnitude of the steering torque T is larger as the absolute value of the positive or negative value is larger.

The steering operation mechanism 4 is composed of a rack-and-pinion mechanism that includes a pinion shaft 13 and a rack shaft 14 that serves as a steered shaft. The steered wheels 3 are coupled to end portions of the rack shaft 14 via tie rods 15 and knuckle arms (not illustrated). The pinion shaft 13 is coupled to the intermediate shaft 7. The pinion shaft 13 is rotated in conjunction with a steering operation of the steering wheel 2. A pinion 16 is coupled to the distal end (the lower end in FIG. 1) of the pinion shaft 13.

The rack shaft 14 extends linearly along the right-left direction of the automobile. A rack 17 meshed with the pinion 16 is formed at an intermediate portion of the rack shaft 14 in the axial direction. The pinion 16 and the rack 17 convert rotation of the pinion shaft 13 into movement of the rack shaft 14 in the axial direction. The steered wheels 3 can be steered by moving the rack shaft 14 in the axial direction.

When the steering wheel 2 is operated (rotated), rotation of the steering wheel 2 is transferred to the pinion shaft 13 via the steering shaft 6 and the intermediate shaft 7. The pinion 16 and the rack 17 convert rotation of the pinion shaft 13 into movement of the rack shaft 14 in the axial direction. Consequently, the steered wheels 3 are steered. The steering assist mechanism 5 includes an electric motor 18 for steering assist, and a speed reduction mechanism 19 configured to transfer output torque from the electric motor 18 toward the steering operation mechanism 4. The electric motor 18 is a three-phase brushless motor (two-system motor) that has a three-phase motor coil 18A (see FIGS. 2 and 3) in a first system and a three-phase motor coil 18B (see FIGS. 2 and 3) in a second system. The three-phase motor coil 18A in the first system is driven by a motor drive circuit 32A (see FIGS. 2 and 3) in the first system to be discussed later. The three-phase motor coil 18B in the second system is driven by a motor drive circuit 32B (see FIGS. 2 and 3) in the second system to be discussed later.

Hereinafter, the three-phase motor coil 18A in the first system will be occasionally referred to as a first motor coil 18A, and the three-phase motor coil 18B in the second system will be occasionally referred to as a second motor coil 18B. Similarly, the motor drive circuit 32A in the first system will be occasionally referred to as a first motor drive circuit 32A, and the motor drive circuit 32B in the second system will be occasionally referred to as a second motor drive circuit 32B. The electric motor 18 is provided with a rotational angle sensor 23 such as a resolver, for example, configured to detect the rotational angle of a rotor of the electric motor 18. The speed reduction mechanism 19 is composed of a worm gear mechanism that includes a worm shaft 20 and a worm wheel 21 meshed with the worm shaft 20.

The worm shaft 20 is rotationally driven by the electric motor 18. The worm wheel 21 is coupled so as to be rotatable together with the steering shaft 6. The worm wheel 21 is rotationally driven by the worm shaft 20. When the worm shaft 20 is rotationally driven by the electric motor 18, the worm wheel 21 is rotationally driven to rotate the steering shaft 6. Rotation of the steering shaft 6 is transferred to the pinion shaft 13 via the intermediate shaft 7. Rotation of the pinion shaft 13 is converted into movement of the rack shaft 14 in the axial direction. Consequently, the steered wheels 3 are steered. That is, the worm shaft 20 is rotationally driven by the electric motor 18 to enable steering assist by the electric motor 18.

The vehicle is provided with a vehicle speed sensor 24 configured to detect a vehicle speed V. The steering torque T which is detected by the torque sensor 11, the vehicle speed V which is detected by the vehicle speed sensor 24, an output signal from the rotational angle sensor 23, etc. are input to an electronic control unit (ECU) 12. The ECU 12 controls the electric motor 18 on the basis of such input signals.

Figure 2:
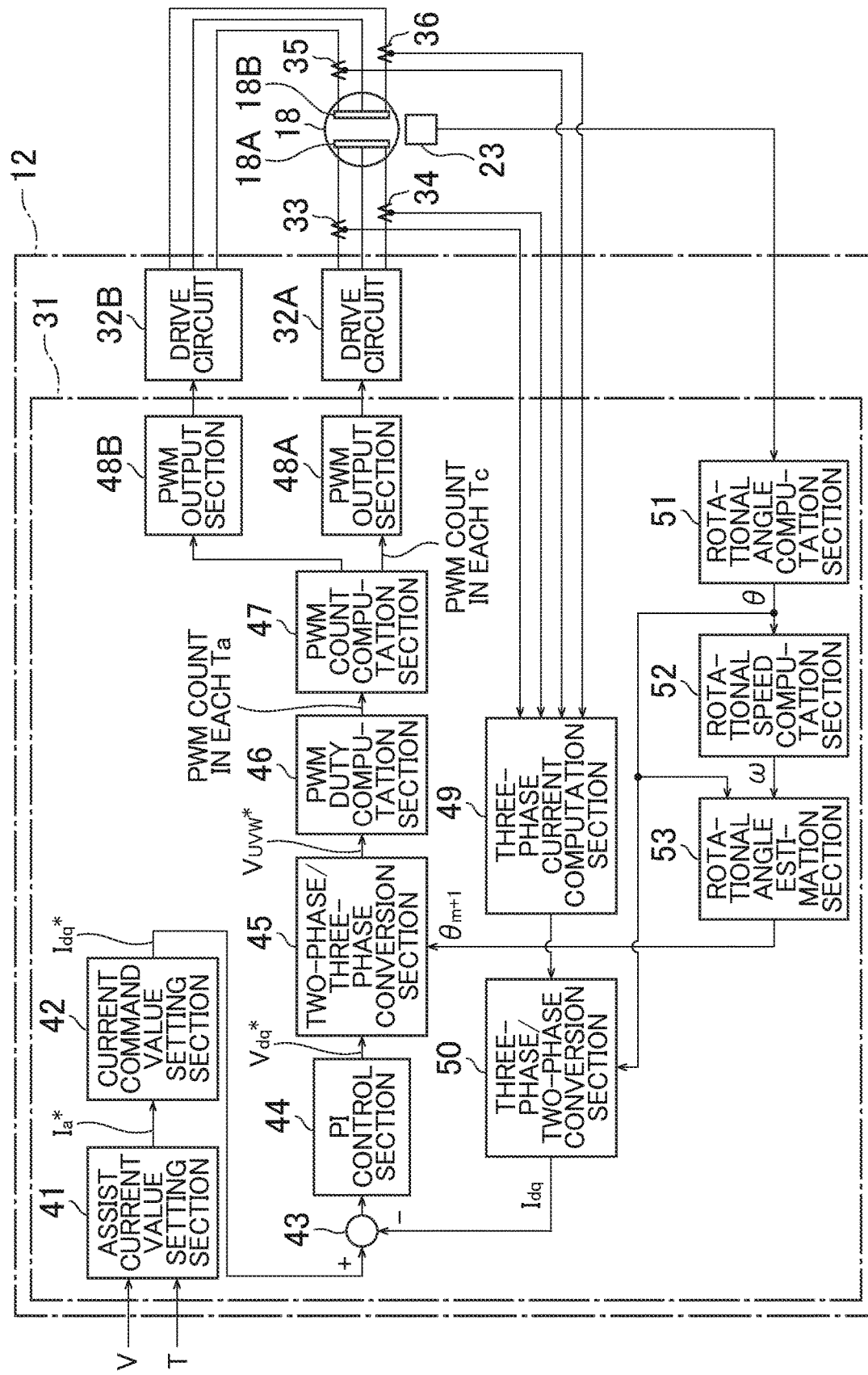
FIG. 2 is a block diagram illustrating the electric configuration of an ECU.

FIG. 2 is a block diagram illustrating the overall electric configuration of the ECU 12. The ECU 12 includes a microcomputer 31, the first motor drive circuit 32A, and the second motor drive circuit 32B. The first motor drive circuit 32A is controlled by the microcomputer 31, and supplies power to the first motor coil 18A of the electric motor 18. The second motor drive circuit 32B is controlled by the microcomputer 31, and supplies power to the second motor coil 18B of the electric motor 18.

Figure 3:
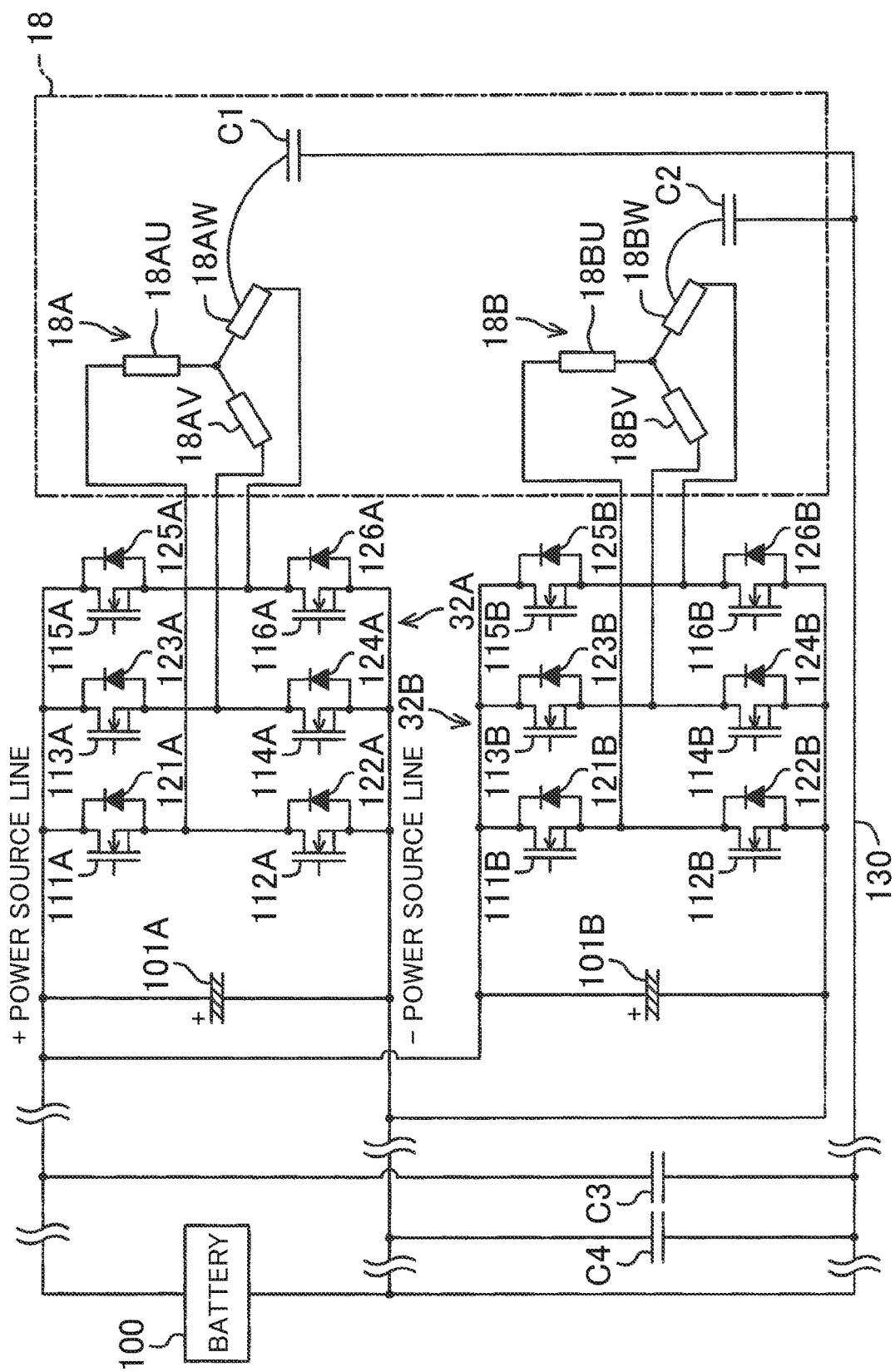
FIG. 3 is an electric circuit diagram mainly illustrating the configuration of a first motor drive circuit and a second motor drive circuit.

FIG. 3 is an electric circuit diagram mainly illustrating the configuration of the first motor drive circuit 32A and the second motor drive circuit 32B. The first motor coil 18A has stator coils 18AU, 18AV, and 18AW for U-phase, V-phase, and W-phase. The second motor coil 18B has stator coils 18BU, 18BV, and 18BW for U-phase, V-phase, and W-phase. In the embodiment, the second three-phase motor coil 18B has a phase difference of 180 degrees with respect to the first three-phase motor coil 18A.

The first motor drive circuit 32A is a three-phase inverter circuit. The first motor drive circuit 32A includes a first smoothing capacitor 101A connected in series with a power source (battery) 100, a plurality of switching elements 111A to 116A, and a plurality of diodes 121A to 126A. The first smoothing capacitor 101A is connected between both terminals of the power source 100. In the embodiment, the switching elements 111A to 116A are each constituted from an n-channel metal oxide semiconductor field effect transistor (MOSFET). Hereinafter, the switching elements 111A to 116A will be occasionally referred to as FETs 111A to 116A.

The plurality of FETs 111A to 116A include an upper FET 111A for U-phase, a lower FET 112A for U-phase connected in series thereto, an upper FET 113A for V-phase, a lower FET 114A for V-phase connected in series thereto, an upper FET 115A for W-phase, and a lower FET 116A for W-phase connected in series thereto. The switching elements 111A to 116A are connected in inverse parallel with the diodes 121A to 126A, respectively.

The drain of the upper FET 111A, 113A, 115A is connected to a positive electrode terminal of the first smoothing capacitor 101A. The source of the upper FET 111A, 113A, 115A is connected to the drain of the lower FET 112A, 114A, 116A, respectively. The source of the lower FET 112A, 114A, 116A is connected to a negative electrode terminal of the first smoothing capacitor 101A.

The point of connection between the upper FET 111A and the lower FET 112A for U-phase is connected to the stator coil 18AU for U-phase of the first motor coil 18A. The point of connection between the upper FET 113A and the lower FET 114A for V-phase is connected to the stator coil 18AV for V-phase of the first motor coil 18A. The point of connection between the upper FET 115A and the lower FET 116A for W-phase is connected to the stator coil 18AW for W-phase of the first motor coil 18A. The FETs 111A to 116A are controlled on the basis of a PWM signal output from a PWM output section 48A (see FIG. 2) in the first system to be discussed later.

The second motor drive circuit 32B is a three-phase inverter circuit. The second motor drive circuit 32B includes a second smoothing capacitor 101B connected in series with the power source (battery) 100, a plurality of switching elements 111B to 116B, and a plurality of diodes 121B to 126B. The second smoothing capacitor 101B is connected between both terminals of the power source 100. In the embodiment, the switching elements 111B to 116B are each constituted from an n-channel MOSFET. Hereinafter, the switching elements 111B to 116B will be occasionally referred to as FETs 111B to 116B.

The plurality of FETs 111B to 116B include an upper FET 111B for U-phase, a lower FET 112B for U-phase connected in series thereto, an upper FET 113B for V-phase, a lower FET 114B for V-phase connected in series thereto, an upper FET 115B for W-phase, and a lower FET 116B for W-phase connected in series thereto. The switching elements 111B to 116B are connected in inverse parallel with the diodes 121B to 126B, respectively.

The drain of the upper FET 111B, 113B, 115B is connected to a positive electrode terminal of the second smoothing capacitor 101B. The source of the upper FET 111B, 113B, 115B is connected to the drain of the lower FET 112B, 114B, 116B, respectively. The source of the lower FET 112B, 114B, 116B is connected to a negative electrode terminal of the second smoothing capacitor 101B.

The point of connection between the upper FET 111B and the lower FET 112B for U-phase is connected to the stator coil 18BU for U-phase of the second motor coil 18B. The point of connection between the upper FET 113B and the lower FET 114B for V-phase is connected to the stator coil 18BV for V-phase of the second motor coil 18B. The point of connection between the upper FET 115B and the lower FET 116B for W-phase is connected to the stator coil 18BW for W-phase of the second motor coil 18B. The FETs 111B to 116B are controlled on the basis of a PWM signal output from a PWM output section 48B (see FIG. 2) in the second system to be discussed later.

In FIG. 3, the power source 100 is mounted on the vehicle. A negative (−) electrode of the power source 100 is electrically connected to a frame (chassis) 130, which is made of metal, of the vehicle. Therefore, the frame 130 is at the same potential as the negative electrode of the power source 100. The electric power steering system 1 on which the electric motor 18 is mounted is attached to the frame 130 by a bolt or the like. The + power source line and the − power source line of the ECU are connected to the positive and negative electrodes, respectively, of the power source 100 through long lines. Therefore, stray capacitances C1 and C2 are present between the first and second motor coils 18A and 18B, respectively, and the frame 130. Stray capacitances C3 and C4 are present between the positive and negative power source lines, respectively, which connect between the power source 100 and the electric power steering system 1 and the frame ground.

Returning to FIG. 2, two current sensors 33 and 34 are provided in power supply lines configured to connect between the first motor drive circuit 32A and the first motor coil 18A. Such current sensors 33 and 34 are provided so as to be able to detect phase currents that flow through two of three power supply lines configured to connect between the first motor drive circuit 32A and the first motor coil 18A.

Similarly, two current sensors 35 and 36 are provided in power supply lines configured to connect between the second motor drive circuit 32B and the second motor coil 18B. Such current sensors 35 and 36 are provided so as to be able to detect phase currents that flow through two of three power supply lines configured to connect between the second motor drive circuit 32B and the second motor coil 18B.

The microcomputer 31 includes a central processing unit (CPU) and a memory (such as a read-only memory (ROM), a random-access memory (RAM), and a non-volatile memory), and executes a predetermined program to function as a plurality of function processing sections. The plurality of function processing sections include an assist current value setting section 41, a current command value setting section 42, a current deviation computation section 43, a proportional-integral (PI) control section 44, a two-phase/three-phase conversion section 45, a PWM duty computation section 46, a PWM count computation section 47, the PWM output section 48A in the first system, the PWM output section 48B in the second system, a three-phase current computation section 49, a three-phase/two-phase conversion section 50, a rotational angle computation section 51, a rotational speed computation section 52, and a rotational angle estimation section 53. Hereinafter, the PWM output section 48A in the first system will be occasionally referred to as a first PWM output section 48A, and the PWM output section 48B in the second system will be occasionally referred to as a second PWM output section 48B.

Figure 4A:
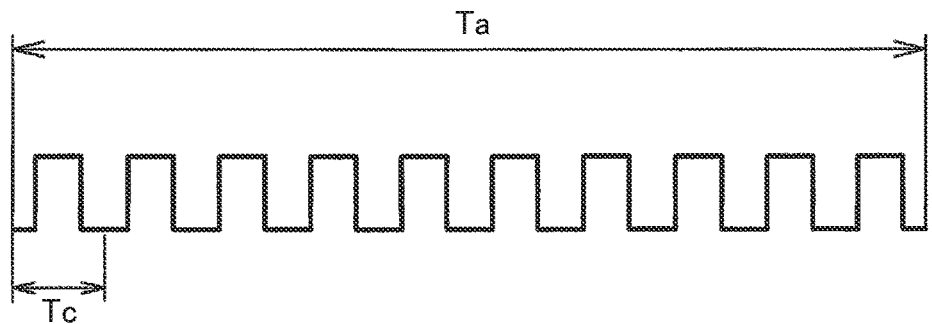
FIG. 4A is a schematic chart illustrating the relationship between a PWM signal cycle Tc and a current control cycle Ta.

As indicated in FIG. 4A, a cycle (hereinafter referred to as a "PWM cycle") Tc of the PWM signal is shorter than a current control cycle Ta. The current control cycle Ta is the computation cycle of the control loop of the motor current. The current control cycle Ta is determined in consideration of the scale of the program, the computation capacity of the microcomputer 31, etc. In the embodiment, PWM duties are updated by the PWM duty computation section 46 at the first timing in the present current control cycle Ta to output updated PWM duties. In the embodiment, Tc is one-tenth of Ta. In other words, each current control cycle Ta includes ten PWM cycles Tc. The first cycle of the ten PWM cycles Tc is occasionally referred to as a first cycle, and the subsequent cycles are occasionally referred to as second, third, . . . , ninth, and tenth cycles. The cycle number of the PWM cycles is occasionally represented by the symbol "i" (i=1, 2, . . . , 9, and 10). The frequency (=1/Tc) of the PWM signal is called a carrier frequency.

Figure 4B:
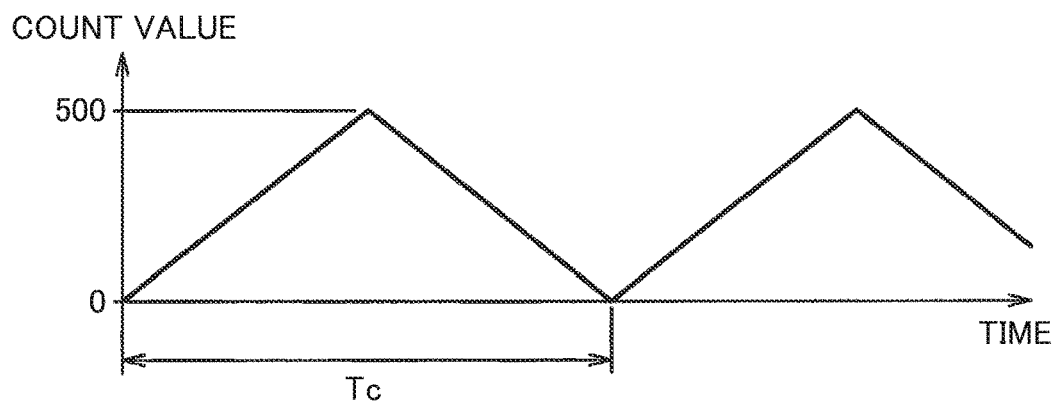
FIG. 4B is a waveform chart illustrating a carrier waveform.

A PWM waveform generation method according to the present embodiment will be described. The clocks of a PWM clock frequency generated by a clock generator (not illustrated) in the microcomputer 31 are counted up and counted down by a counter (not illustrated). The count value of the counter is indicated in FIG. 4B in which the horizontal axis represents the time and the vertical axis represents the count value. The count value is interpreted as an unsigned integer. The count value is occasionally called a carrier count. In the embodiment, the waveform in FIG. 4B is a carrier waveform. The carrier waveform is a triangular waveform. One cycle of the triangular waveform is equal to Tc. The frequency (carrier frequency) of the PWM signal is determined by the maximum value of the carrier waveform, that is, the maximum value of the count value. In the present embodiment, the PWM clock frequency is 100 [MHz], and the frequency (hereinafter referred to as the "PWM frequency") of the PWM signal is set to 100 [kHz]. Therefore, the maximum value of the count value is 100,000,000÷100,000÷2=500. 100,000,000/100,000 is divided by 2 since the clocks are counted up and down.

Figure 4C:
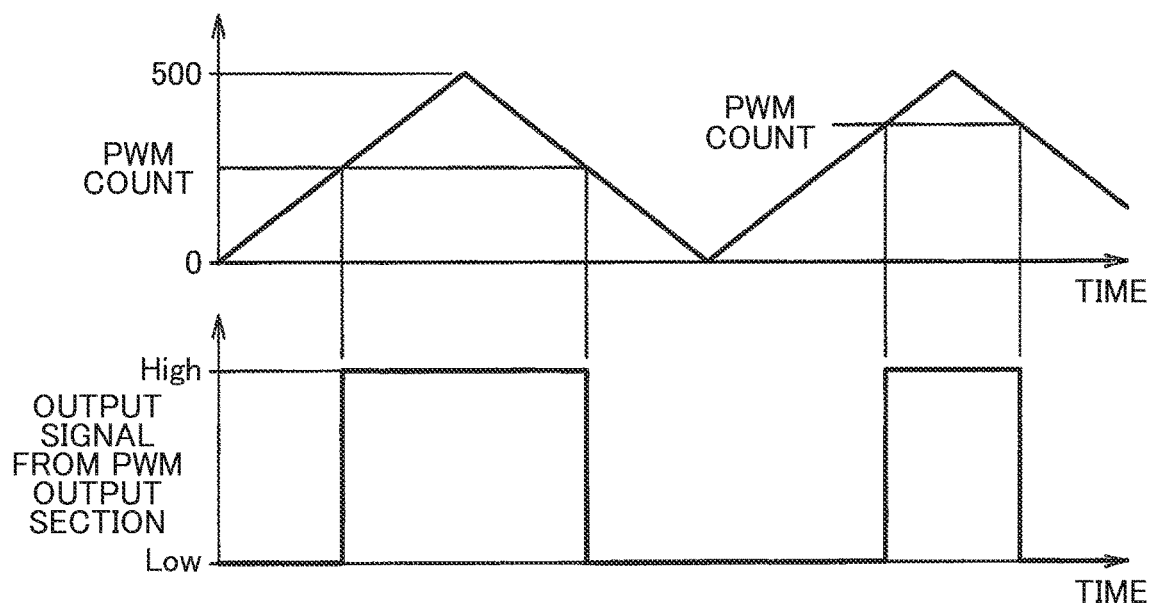
FIG. 4C is a schematic chart illustrating a PWM signal generation method.

As illustrated in FIG. 4C, the PWM output sections 48A and 48B (see FIG. 2) compare a PWM count given from the PWM count computation section 47 and the count value of the counter, and output a High signal or a Low signal to the motor drive circuits 32A and 32B (see FIG. 2), respectively. The PWM output sections 48A and 48B output a High signal (or a Low signal) while the count value of the counter is equal to or more than the PWM count, and output a Low signal (or a High signal) otherwise, for example. The High signal and the Low signal are used as the PWM signal.

In the embodiment, the following two patterns are provided as variation patterns (on/off patterns) of the on/off state of the upper FETs and the lower FETs in the PWM cycle Tc.

First on/off pattern: a pattern in which the on/off state is varied, from the start of the carrier count, in the order of upper FET on state→lower FET on state→upper FET on state Second on/off pattern: a pattern in which the on/off state is varied, from the start of the carrier count, in the order of lower FET on state→upper FET on state→lower FET on state In the embodiment, the upper and lower FETs for each phase in the first system are controlled in accordance with the first on/off pattern, and the upper and lower FETs for each phase in the second system are controlled in accordance with the second on/off pattern. Returning to FIG. 2, the three-phase current computation section 49 computes a total U-phase current, a total V-phase current, and a total W-phase current. Specifically, the three-phase current computation section 49 computes phase currents $Iu_1$, $Iv_1$, and $Iw_1$ for U-phase, V-phase, and W-phase in the first system from detected values of two phase currents in the first system detected by the current sensors 33 and 34. The three-phase current computation section 49 computes phase currents $Iu_2$, $Iv_2$, and $Iw_2$ for U-phase, V-phase, and W-phase in the second system from detected values of two phase currents in the second system detected by the current sensors 35 and 36. Then, the three-phase current computation section 49 computes the total U-phase current Iu, the total V-phase current Iv, and the total W-phase current Iw on the basis of the phase currents $Iu_1$, $Iv_1$, and $Iw_1$ for U-phase, V-phase, and W-phase in the first system and the phase currents $Iu_2$, $Iv_2$, and $Iw_2$ for U-phase, V-phase, and W-phase in the second system. In the embodiment, the phase difference between the first three-phase motor coil 18A and the second three-phase motor coil 18B is 180 degrees. Therefore, the three-phase current computation section 49 computes the total U-phase current Iu, the total V-phase current Iv, and the total W-phase current Iw for current control on the basis of the following formula (1).

$$Iu = Iu_1 - Iu_2$$

$$Iv = Iv_1 - Iv_2$$

$$Iw = Iw_1 - Iw_2 \quad (1)$$

The rotational angle computation section 51 computes a rotational angle θ (electrical angle) of the rotor of the electric motor 18 on the basis of an output signal from the rotational angle sensor 23 in each current control cycle Ta. In the embodiment, the rotational angle computation section 51 computes the rotational angle (electrical angle) of the rotor of the electric motor 18 with respect to U-phase of the three-phase motor coil 18A in the first system as the rotor rotational angle θ. The rotor rotational angle θ, which is computed by the rotational angle computation section 51, is provided to the three-phase/two-phase conversion section 50, the rotational speed computation section 52, and the rotational angle estimation section 53. In the embodiment, the rotor rotational angle θ is acquired (detected) at the timing at the middle of the current control cycle Ta.

The rotational speed computation section 52 computes a rotational speed (angular velocity) ω of the rotor of the electric motor 18 by differentiating the rotor rotational angle θ, which is computed by the rotational angle computation section 51, with respect to time. The rotational speed ω, which is computed by the rotational speed computation section 52, is provided to the rotational angle estimation section 53. The rotational angle estimation section 53 estimates a rotor rotational angle $θ_{(m+1)}$ at the middle of the next current control cycle Ta on the basis of the following formula (2) using the rotor rotational angle $θ_{(m-1)}$ at the middle of the previous current control cycle Ta, which is acquired in the previous current control cycle Ta.

$$θ_{(m+1)} = θ_{(m-1)} + ω \cdot 2Ta \quad (2)$$

Figure 5:
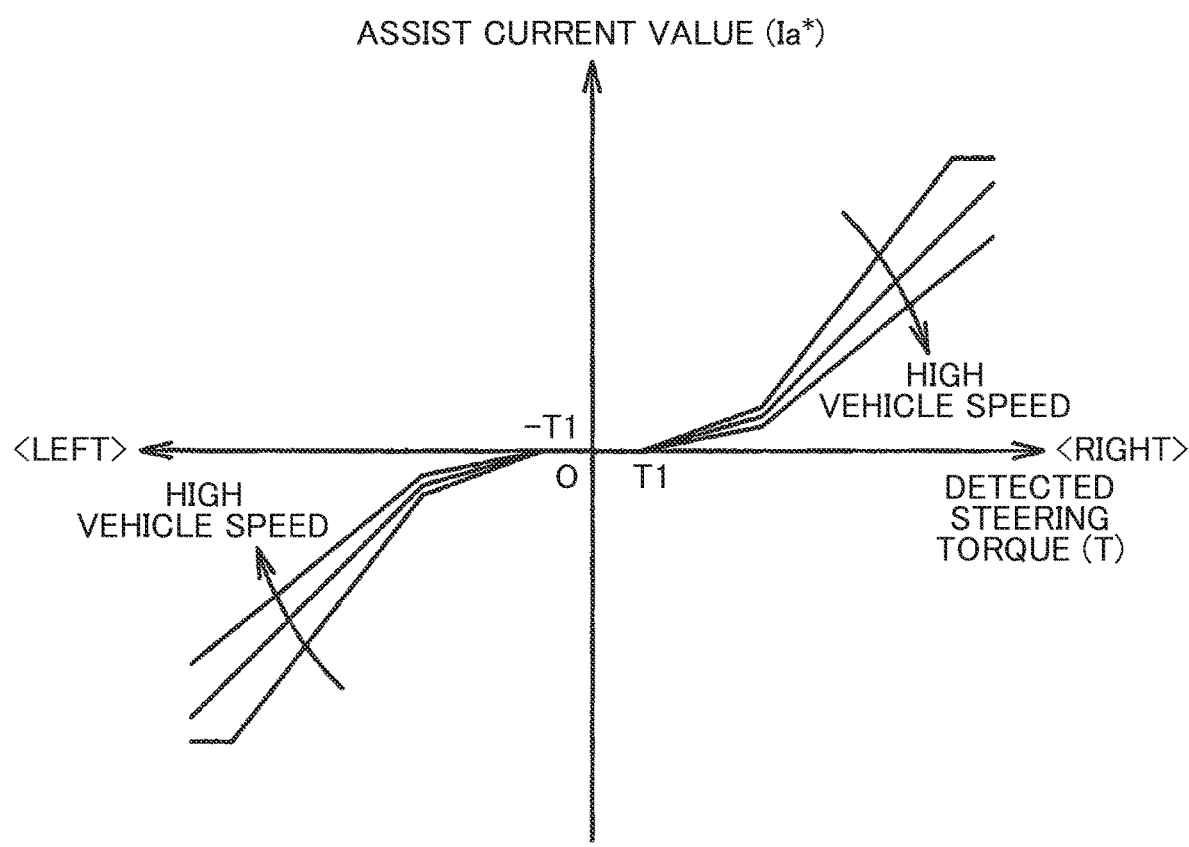
FIG. 5 is a graph illustrating an example of an assist current value Ia* set with respect to detected steering torque T.

The rotor rotational angle $θ_{(m+1)}$ in the next current control cycle Ta, which is estimated by the rotational angle estimation section 53, is provided to the two-phase/three-phase conversion section 45. The assist current value setting section 41 sets an assist current value Ia* in each current control cycle Ta on the basis of the detected steering torque T, which is detected by the torque sensor 11, and the vehicle speed V, which is detected by the vehicle speed sensor 24. An example of the assist current value Ia* which is set with respect to the detected steering torque T is illustrated in FIG. 5. The detected steering torque T has a positive value when the torque is applied to steer the vehicle to the right, and a negative value when the torque is applied to steer the vehicle to the left, for example. The assist current value Ia* has a positive value when the electric motor 18 should generate a steering assist force for steering the vehicle to the right, and a negative value when the electric motor 18 should generate a steering assist force for steering the vehicle to the left. The assist current value Ia* becomes positive when the detected steering torque T has a positive value, and becomes negative when the detected steering torque T has a negative value.

When the detected steering torque T has a very small value in the range (torque dead band) of −T1 to T1 (e.g. T1=0.4 N·m), the assist current value Ia* is set to zero. In the case where the detected steering torque T has a value outside the range of −T1 to T1, the assist current value Ia* is set such that the absolute value thereof becomes larger as the absolute value of the detected steering torque T becomes larger. The assist current value Ia* is also set such that the absolute value thereof becomes smaller as the vehicle speed V, which is detected by the vehicle speed sensor 24, becomes higher. Consequently, a large assist force is generated during low-speed travel, and a small assist force is generated during high-speed travel.

The current command value setting section 42 sets the values of currents that should flow on the coordinate axes of a dq coordinate system as current command values on the basis of the assist current value Ia*, which is set by the assist current value setting section 41. Specifically, the current command value setting section 42 sets a d-axis current command value $I_d^*$ and a q-axis current command value $I_q^*$ (which will hereinafter be referred to collectively as "two-phase current command values $I_{dq}^*$"). Further specifically, the current command value setting section 42 sets the q-axis current command value $I_q^*$ to the assist current value Ia*, which is set by the assist current value setting section 41, and sets the d-axis current command value $I_d^*$ to zero. The two-phase current command values $I_{dq}^*$, which are set by the current command value setting section 42, are provided to the current deviation computation section 43.

The three-phase/two-phase conversion section 50 performs a coordinate conversion on the total U-phase current Iu, the total V-phase current Iv, and the total W-phase current Iw for current control, which are computed by the three-phase current computation section 49, into detected two-phase currents $I_{dq}$ for the dq coordinate system. The detected two-phase currents $I_{dq}$ include a detected d-axis current $I_d$ and a detected q-axis current $I_q$. The rotor rotational angle θ, which is computed by the rotational angle computation section 51, is used in the coordinate conversion.

The current deviation computation section 43 computes a deviation of the detected d-axis current $I_d$ from the d-axis current command value $I_d^*$ and a deviation of the detected q-axis current $I_q$ from the q-axis current command value $I_q^*$. Such deviations are provided to the PI control section 44. The PI control section 44 performs a PI computation on the current deviations which are computed by the current deviation computation section 43. Consequently, two-phase voltage command values $V_{dq}^*$ (a d-axis voltage command value $V_d^*$ and a q-axis voltage command value $V_q^*$) to be applied to the electric motor 18 are generated. The two-phase voltage command values $V_{dq}^*$ are provided to the two-phase/three-phase conversion section 45.

The two-phase/three-phase conversion section 45 performs a two-phase/three-phase conversion on the two-phase voltage command values $V_{dq}^*$, which are computed by the PI control section 44 in the present current control cycle Ta, using an estimated rotational angle value $θ_{(m+1)}$ for the next current control cycle Ta, which is computed by the rotational angle estimation section 53 in the present current control cycle Ta. Consequently, three-phase voltage command values $V_{UVW}^*$ for the next current control cycle Ta are computed. The three-phase voltage command values $V_{UVW}^*$ include a U-phase voltage command value $V_U^*$, a V-phase voltage command value $V_V^*$, and a W-phase voltage command value $V_W^*$. Consequently, three-phase voltage command values $V_{UVW}^*$ for the next current control cycle Ta are obtained.

The three-phase voltage command values $V_{UVW}^*$ for the next current control cycle Ta, which are obtained by the two-phase/three-phase conversion section 45, are provided to the PWM duty computation section 46. The PWM duty computation section 46 computes PWM counts $Cu_{1A}$, $Cv_{1A}$, and $Cw_{1A}$ for each phase in the first system for the next current control cycle Ta on the basis of the three-phase voltage command values $V_{UVW}^*$ for the next current control cycle Ta. As discussed later, the PWM counts $Cu_{1A}$, $Cv_{1A}$, and $Cw_{1A}$ for each phase in the first system for the next current control cycle Ta are set as PWM counts $Cu_{1C}$, $Cv_{1C}$, and $Cw_{1C}$, respectively, for each phase in the first system for each PWM cycle in the next current control cycle Ta. Thus, the PWM counts for each phase in the first system for the next current control cycle Ta, which are computed by the PWM duty computation section 46, can also be considered as PWM counts for each phase in the first system for each PWM cycle in the next current control cycle Ta.

The U-phase PWM count $Cu_{1A}$ in the first system is calculated as follows. That is, the PWM duty computation section 46 computes the U-phase PWM count $Cu_{1A}$ in the first system for a certain current control cycle Ta on the basis of the following formula (3) using the U-phase voltage command value $V_U^*$ for the relevant current control cycle Ta, which is obtained by the two-phase/three-phase conversion section 45, and the maximum value Cmax of the PWM count.

$$Cu_{1A} = V_U^* \times (Cmax/Vb)$$

$$= V_U^* \times (500/Vb) \quad (3)$$

In the formula (3), Vb is the power source voltage for the motor drive circuit 32 (output voltage of the power source 100). The V-phase PWM count $Cv_{1A}$ in the first system can be computed by using the V-phase voltage command value $V_V^*$ in place of the U-phase voltage command value $V_U^*$ on the right side of the formula (3). The W-phase PWM count $Cw_{1A}$ in the first system can be computed by using the W-phase voltage command value $V_W^*$ in place of the U-phase voltage command value $V_U^*$ on the right side of the formula (3).

The PWM count computation section 47 computes the final PWM counts $Cu_1$, $Cv_1$, $Cw_1$, $Cu_2$, $Cv_2$, and $Cw_2$ for each phase in each system for each PWM cycle Tc in the next current control cycle Ta on the basis of the PWM counts $Cu_{1A}$, $Cv_{1A}$, and $Cw_{1A}$ for each phase in the first system for the next current control cycle Ta, which are computed by the PWM duty computation section 46. Operation of the PWM count computation section 47 will be discussed in detail later.

The final PWM count for each phase in the first system for each PWM cycle Tc in the next current control cycle Ta, which is computed by the PWM count computation section 47, is provided to the first PWM output section 48A. On the other hand, the final PWM count for each phase in the second system for each PWM cycle Tc in the next current control cycle Ta, which is computed by the PWM count computation section 47, is provided to the second PWM output section 48B.

The first PWM output section 48A stores the final PWM count for each phase in the first system for each PWM cycle Tc in the current control cycle Ta, which is provided from the PWM count computation section 47, for a plurality of current control cycles. The first PWM output section 48A generates a PWM signal for each phase in the first system for each PWM cycle Tc in the present current control cycle Ta on the basis of the final PWM count for each phase in the first system for each PWM cycle Tc in the present current control cycle Ta, which is provided from the PWM count computation section 47 in the previous current control cycle Ta, and supplies such a signal to the first motor drive circuit 32A. Specifically, the first PWM output section 48A generates, for each PWM cycle Tc in the present current control cycle Ta, U-phase PWM signal, V-phase PWM signal, and W-phase PWM signal with a duty corresponding to the final U-phase PWM count, final V-phase PWM count, and final W-phase PWM count, respectively, in the first system for each PWM cycle Tc in the relevant current control cycle Ta, and supplies such signals to the first motor drive circuit 32A.

The six FETs 111A to 116A, which constitute the first motor drive circuit 32A, are controlled in accordance with the PWM signals, which are provided from the first PWM output section 48A. Consequently, a voltage corresponding to the first three-phase voltage command values $V_{1UVW}^*$ for each PWM cycle Tc is applied to the stator coils 18AU, 18AV, and 18AW for respective phases of the first motor coil 18A. The second PWM output section 48B stores the final PWM count for each phase in the second system for each PWM cycle Tc in the current control cycle Ta, which is provided from the PWM count computation section 47, for a plurality of current control cycles. The second PWM output section 48B generates a PWM signal for each phase in the second system for each PWM cycle Tc in the present current control cycle Ta on the basis of the final PWM count for each phase in the second system for each PWM cycle Tc in the present current control cycle Ta, which is provided from the PWM count computation section 47 in the previous current control cycle Ta, and supplies such a signal to the second motor drive circuit 32B. Specifically, the second PWM output section 48B generates, for each PWM cycle Tc in the present current control cycle Ta, U-phase PWM signal, V-phase PWM signal, and W-phase PWM signal with a duty corresponding to the final U-phase PWM count, final V-phase PWM count, and final W-phase PWM count, respectively, in the second system for each PWM cycle Tc in the relevant current control cycle Ta, and supplies such signals to the second motor drive circuit 32B.

The six FETs 111B to 116B, which constitute the second motor drive circuit 32B, are controlled in accordance with the PWM signals, which are provided from the second PWM output section 48B. Consequently, a voltage corresponding to the second three-phase voltage command values $V_{2UVW}^*$ for each PWM cycle Tc is applied to the stator coils 18BU, 18BV, and 18BW for respective phases of the second motor coil 18B. Operation of the PWM count computation section 47 will be described in detail below.

Figure 6:
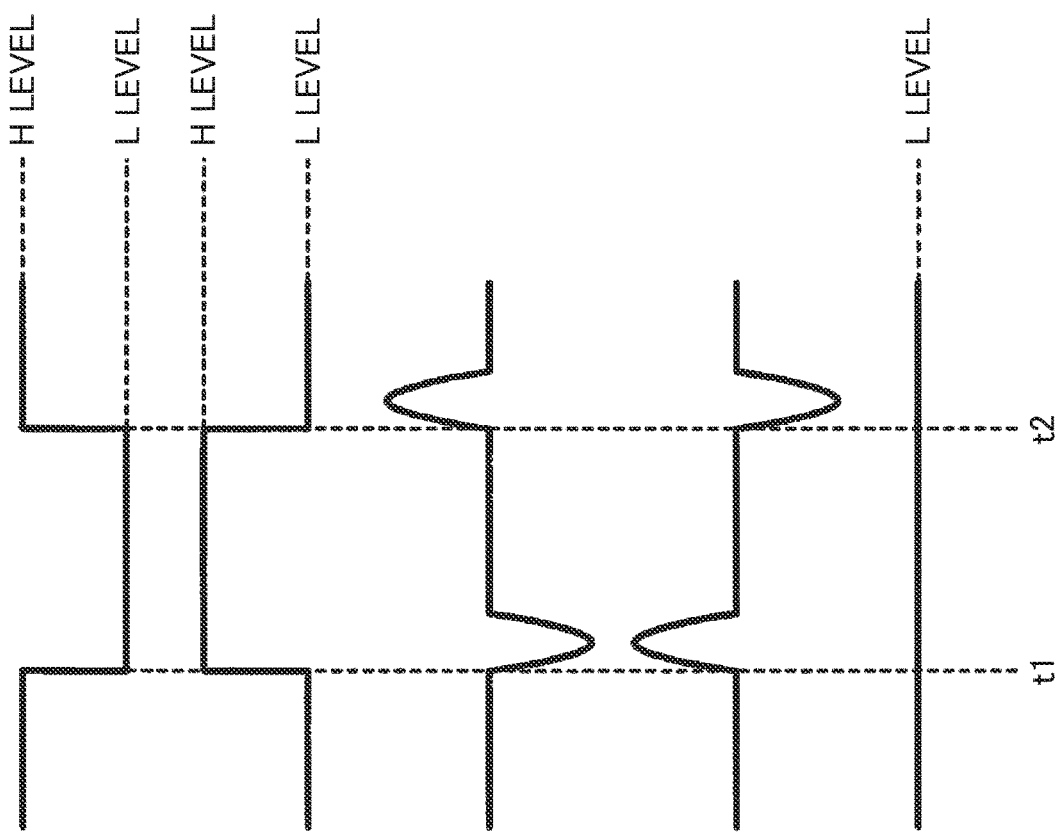
FIG. 6 illustrates the basic idea of a common mode noise reduction performed by a common mode noise reduction section.

In the case where the waveform of an output voltage (hereinafter referred to as a first phase voltage) for a certain phase in the first system is as indicated by (a) in FIG. 6, a current that flows through the stray capacitance C1 (see FIG. 3), which is present between the first motor coil 18A and the frame ground, because of the first phase voltage is as indicated by (c) in FIG. 6. That is, a current in the − direction flows through the stray capacitance C1 at the time of fall t1 of the first phase voltage, and a current in the + direction flows through the stray capacitance C1 at the time of rise t2 of the first phase voltage.

If the waveform of an output voltage (hereinafter referred to as a second phase voltage) for a certain phase in the second system is a waveform obtained by inverting the waveform of the first phase voltage of (a) in FIG. 6 as indicated by (b) in FIG. 6, a current that flows through the stray capacitance C2 (see FIG. 3), which is present between the second motor coil 18B and the frame ground, because of the second phase voltage is as indicated by (d) in FIG. 6. That is, a current in the + direction flows through the stray capacitance C2 at the time of rise t1 of the second phase voltage, and a current in the − direction flows through the stray capacitance C2 at the time of fall t2 of the second phase voltage. Thus, the current which flows through the stray capacitance C1 because of the first phase voltage and the current which flows through the stray capacitance C2 because of the second phase voltage cancel out each other at each of the time t1 and the time t2. Therefore, as indicated by (e) in FIG. 6, the currents which flow through the stray capacitances C3 and C4 (see FIG. 3), which are present between the positive and negative power source lines and the frame ground, respectively, are reduced.

Figure 7:
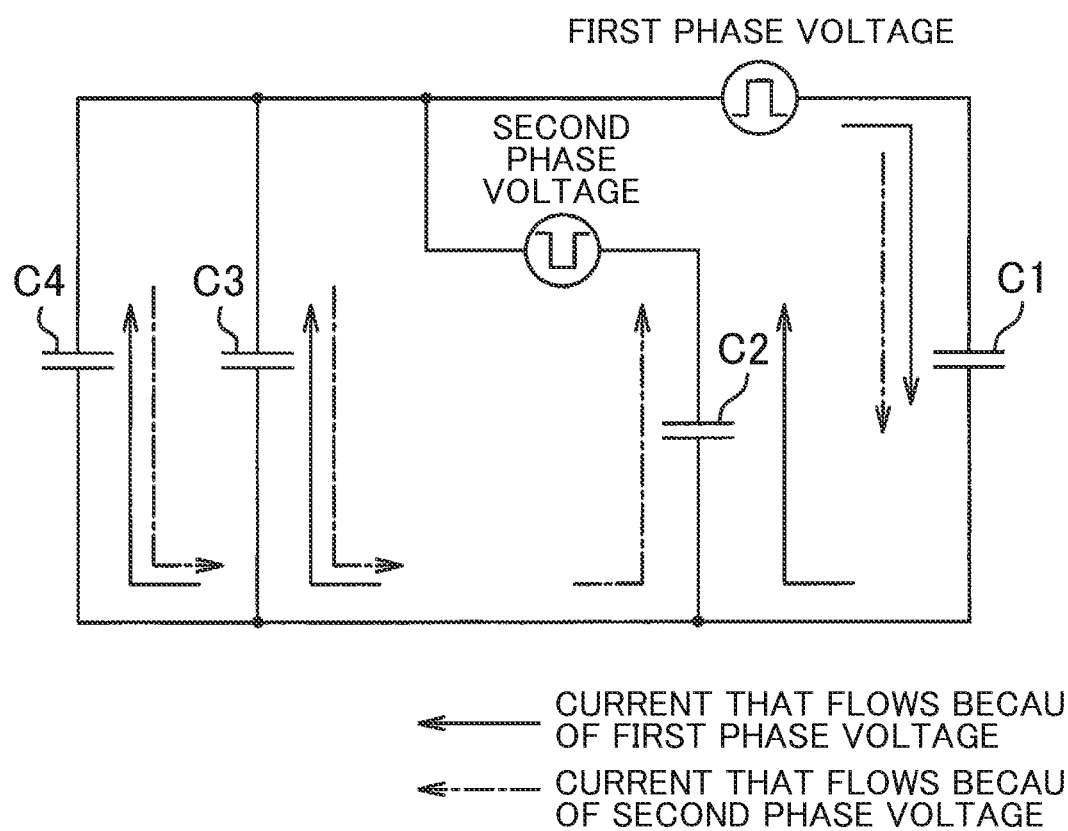
FIG. 7 is a circuit diagram illustrating an equivalent circuit that places a focus on common mode noise currents.

FIG. 7 illustrates an equivalent circuit that places a focus on common mode noise currents. The first phase voltage and the second phase voltage can be considered as noise generation sources. The positive and negative electrodes of the power source 100 can be considered as being short-circuited for alternating currents such as the common mode noise currents. In FIG. 7, common mode noise currents due to the first phase voltage flow as indicated by the continuous arrows. Common mode noise currents due to the second phase voltage flow as indicated by the long dashed short dashed arrows. Thus, the common mode noise currents which flow through the stray capacitances C3 and C4 are opposite in direction to each other, and thus cancel out each other. As a result, the total common mode noise currents are reduced.

Figure 8:
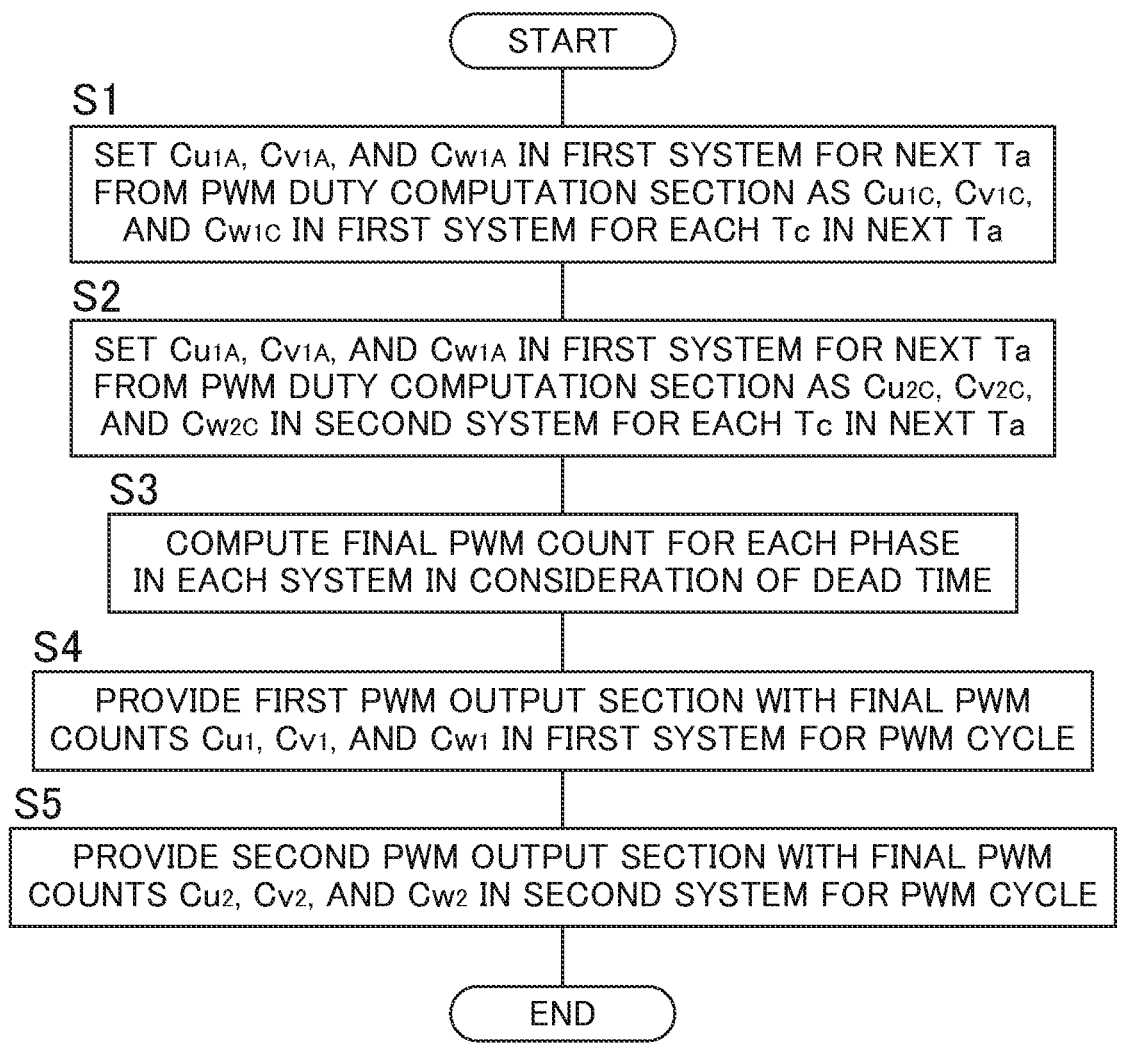
FIG. 8 is a flowchart illustrating an example of operation of the common mode noise reduction section.

In the embodiment, the PWM count computation section 47 computes the final PWM count for each phase in each system such that the waveform of a phase voltage for each phase in the second system is a waveform obtained by inverting the waveform of a phase voltage for the corresponding phase in the first system in each PWM cycle. FIG. 8 is a flowchart illustrating an example of operation of the PWM count computation section 47.

The PWM count computation section 47 sets the PWM counts $Cu_{1A}$, $Cv_{1A}$, and $Cw_{1A}$ for U-phase, V-phase, and W-phase in the first system for the next current control cycle Ta, which are provided from the PWM duty computation section 46, as the PWM counts $Cu_{1C}$, $Cv_{1C}$, and $Cw_{1C}$ for U-phase, V-phase, and W-phase, respectively, in the first system for each PWM cycle Tc in the next current control cycle Ta (step S1). In the embodiment, the PWM counts $Cu_{1C}$, $Cv_{1C}$, and $Cw_{1C}$ for U-phase, V-phase, and W-phase in the first system, which are set in this manner, are treated as PWM counts corresponding to phase voltages which are target values for PWM counts corresponding to the level variation timing of the phase voltages for the corresponding phases in the first system.

The PWM count computation section 47 sets the PWM counts $Cu_{1A}$, $Cv_{1A}$, and $Cw_{1A}$ for U-phase, V-phase, and W-phase in the first system for the next current control cycle Ta, which are provided from the PWM duty computation section 46, as the PWM counts $Cu_{2C}$, $Cv_{2C}$, and $Cw_{2C}$ for U-phase, V-phase, and W-phase, respectively, in the second system for each PWM cycle Tc in the next current control cycle Ta (step S2). In the embodiment, the PWM counts $Cu_{2C}$, $Cv_{2C}$, and $Cw_{2C}$ for U-phase, V-phase, and W-phase in the second system, which are set in this manner, are treated as PWM counts corresponding to phase voltages which are target values for PWM counts corresponding to the level variation timing of the phase voltages for the corresponding phases in the second system.

FIG. 11A is a schematic table illustrating an example of the PWM counts $Cu_{1C}$, $Cv_{1C}$, and $Cw_{1C}$ corresponding to phase voltages for U-phase, V-phase, and W-phase in the first system in each PWM cycle Tc, which are set in step S1, and the PWM counts $Cu_{2C}$, $Cv_{2C}$, and $Cw_{2C}$ corresponding to phase voltages for U-phase, V-phase, and W-phase in the second system in each PWM cycle Tc, which are set in step S2.

Next, the PWM count computation section 47 converts the PWM counts corresponding to phase voltages for each phase in each system, which are set in steps S1 and S2, into the final PWM counts for each phase in each system in consideration of the dead time (step S3). The final PWM counts for each phase in each system are PWM counts for FET control for controlling the upper and lower FETs for the corresponding phase in the corresponding system. The process in step S3 will be described below.

Figure 9:
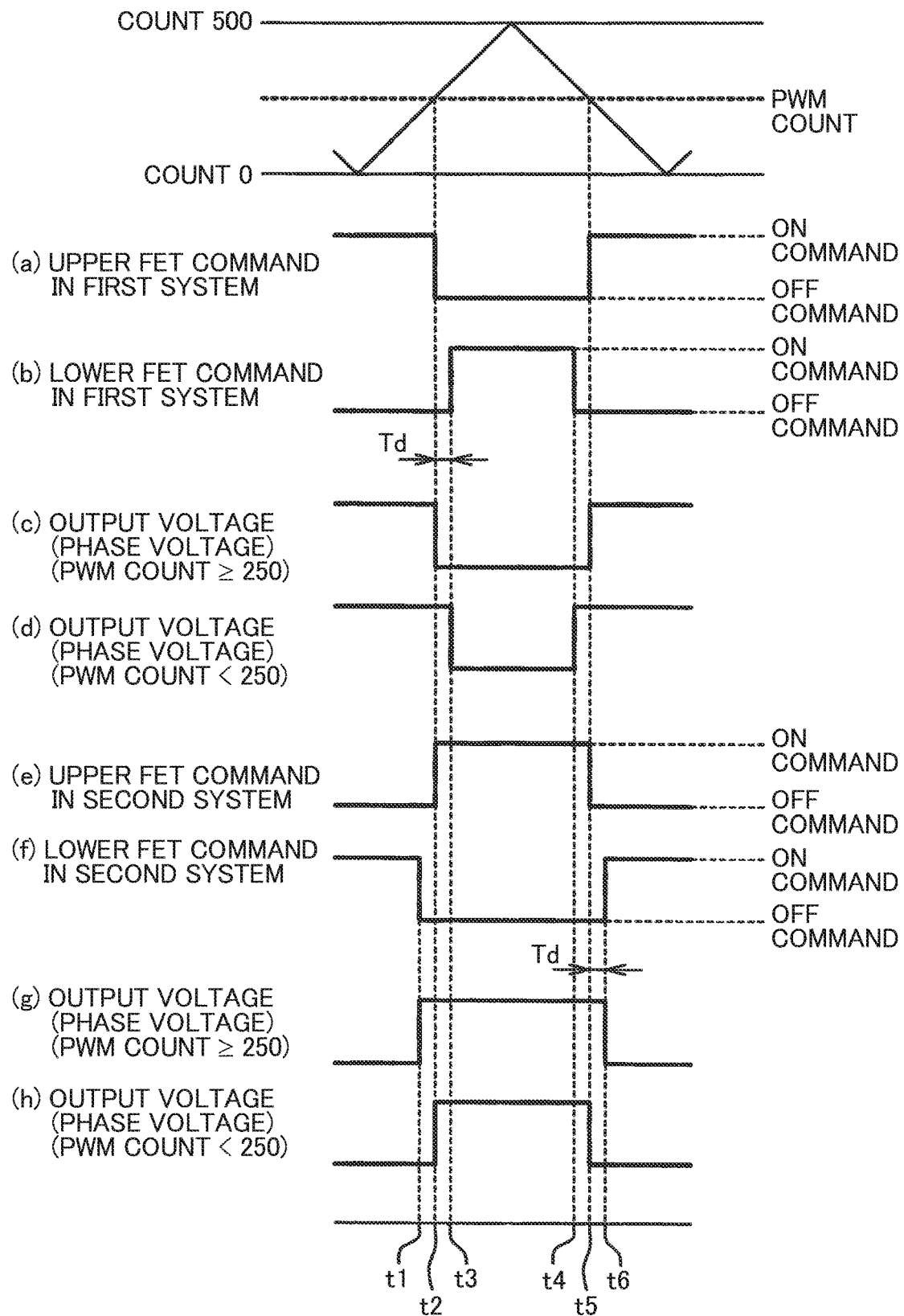
FIG. 9 is a schematic chart mainly illustrating the relationship between a PWM count for FET control and an upper FET command and a lower FET command for each phase in each system.

FIG. 9 is a schematic chart mainly illustrating the relationship between a PWM count for FET control and an upper FET command and a lower FET command for each phase in each system. In other words, FIG. 9 is a schematic chart illustrating an example of operation of the first PWM output section 48A and the second PWM output section 48B (see FIG. 2) for each phase. In the embodiment, as discussed earlier, the carrier waveform is a triangular waveform, and the value that can be output as the PWM count is set to 0 to 500. In the embodiment, the count value corresponding to the dead time is set to 10.

An upper FET command and a lower FET command for each phase in the first system, the upper and lower FETs for which are controlled in accordance with the first on/off pattern, will be described. In the embodiment, the switching timing of the upper FET for each phase in the first system is set such that the upper FET command for each phase in the first system is an off command when the carrier count is larger than the PWM count for FET control. That is, as indicated by (a) in FIG. 9, the upper FET command is varied from an on command to an off command when the carrier count becomes equal to the PWM count for FET control (time t2) while the carrier count is counting up. The upper FET command is varied from an off command to an on command when the carrier count becomes equal to the PWM count for FET control (time t5) while the carrier count is counting down.

As indicated by (b) in FIG. 9, when a dead time Td elapses (time t3) from the time t2, the lower FET command is varied from an off command to an on command. The lower FET command is varied from an on command to an off command at the time (time t4) earlier than the time t5 by the dead time Td. An upper FET command and a lower FET command for each phase in the second system, the upper and lower FETs for which are controlled in accordance with the second on/off pattern, will be described. In the embodiment, the switching timing of the upper FET for each phase in the second system is set such that the upper FET command for each phase in the second system is an on command when the carrier count is larger than the PWM count for FET control. That is, as indicated by (e) in FIG. 9, the upper FET command is varied from an off command to an on command when the carrier count becomes equal to the PWM count for FET control (time t2) while the carrier count is counting up. The upper FET command is varied from an on command to an off command when the carrier count becomes equal to the PWM count for FET control (time t5) while the carrier count is counting down.

As indicated by (f) in FIG. 9, the lower FET command is varied from an on command to an off command at the time (time t1) earlier than the time t2 by the dead time Td. When the dead time Td elapses (time t6) from the time t5, the lower FET command is varied from an off command to an on command. An output voltage (phase voltage) for a certain phase during a dead time period will be described with reference to FIGS. 10A and 10B. Here, U-phase in the first system will be described as an example. The same description also applies to the remaining two phases in the first system and the phases in the second system.

Figure 10A:
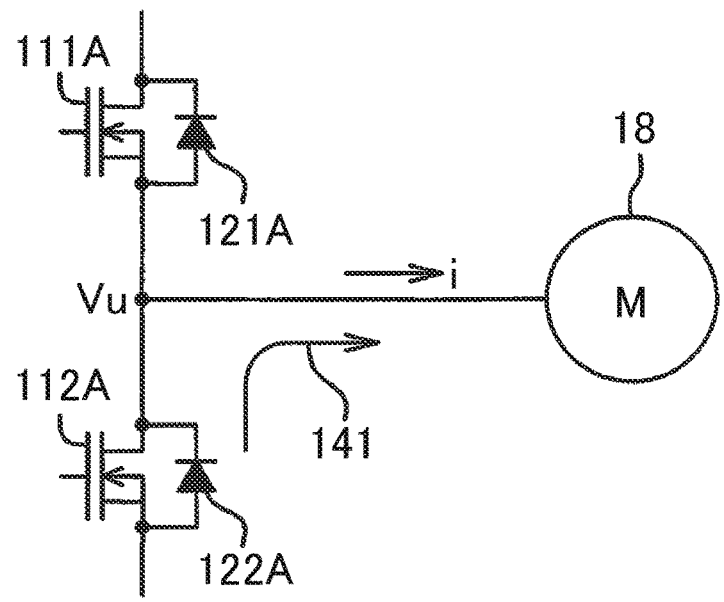
FIG. 10A illustrates a current path during a dead time period with a current flowing from the point of connection between an upper FET and a lower FET toward an electric motor.

As indicated by the symbol "i" in FIG. 10A, in a state in which a current is flowing from the point of connection between the upper FET 111A and the lower FET 112A toward the electric motor 18, a current flows through the diode 122A, which is connected in inverse parallel with the lower FET 112A, as indicated by an arrow 141 during a dead time period. Thus, the output voltage (phase voltage) Vu is at L level during the dead time period. Therefore, the period during which the phase voltage Vu is at L level is the same as an off period of the upper FET 111A.

Figure 10B:
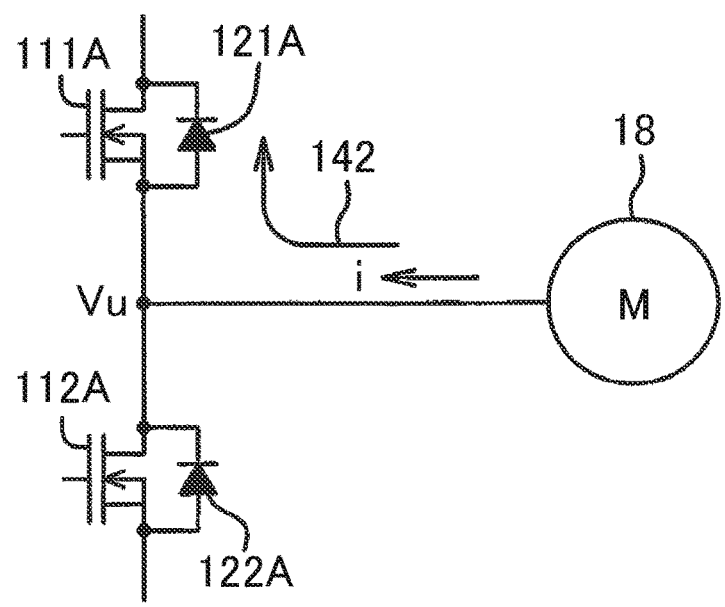
FIG. 10B illustrates a current path during a dead time period with a current flowing from the electric motor toward the point of connection between the upper FET and the lower FET.

As indicated by the symbol "i" in FIG. 10B, in a state in which a current is flowing from the electric motor 18 toward the point of connection between the upper FET 111A and the lower FET 112A, on the other hand, a current flows through the diode 121A, which is connected in inverse parallel with the upper FET 111A, as indicated by an arrow 142 during a dead time period. Thus, the output voltage (phase voltage) Vu is at H level during the dead time period. Therefore, the period during which the phase voltage Vu is at L level is shorter than an off period of the upper FET 111A. In other words, the period during which the phase voltage Vu is at H level is longer than an on period of the upper FET 111A.

In the case where the PWM count for FET control is equal to or more than half the maximum value of the PWM count (equal to or more than 250) in the first system, the on time of the upper FET is longer than that for a case where the PWM count for FET control is not equal to or more than half the maximum value of the PWM count. Thus, in the embodiment, for convenience of description, it is considered that a current is flowing from the point of connection between the upper FET and the lower FET toward the electric motor 18 (as illustrated in FIG. 10A) in the case where the PWM count for FET control is equal to or more than 250. Therefore, it is considered that the output voltage (phase voltage) is at L level during a dead time period. Thus, in this case, it is considered that the phase voltage is varied as indicated by (c) in FIG. 9, and thus the level variation timing (PWM count corresponding to the phase voltage) of the phase voltage and the switching timing (PWM count for FET control) of the upper FET coincide with each other.

In the case where the PWM count for FET control is not equal to or more than half the maximum value of the PWM count (not equal to or more than 250) for the first on/off pattern phases, on the other hand, the on time of the upper FETs is shorter than that for a case where the PWM count for FET control is equal to or more than half the maximum value of the PWM count. Thus, in the embodiment, for convenience of description, it is considered that a current is flowing from the electric motor 18 toward the point of connection between the upper FET and the lower FET (as illustrated in FIG. 10B) in the case where the PWM count for FET control is not equal to or more than 250. Therefore, it is considered that the output voltage (phase voltage) is at H level during a dead time period.

Thus, in this case, it is considered that the phase voltage is varied as indicated by (d) in FIG. 9, and thus the level variation timing (PWM count corresponding to the phase voltage) of the phase voltage and the switching timing (PWM count for FET control) of the upper FET do not coincide with each other. A PWM count (PWM count corresponding to the phase voltage) at which the switching timing of the upper FET coincides with the level variation timing of the phase voltage has a value obtained by adding a count value (in the embodiment, "10") corresponding to the dead time to the PWM count for FET control. Thus, in such a case, it is necessary that the PWM count computation section 47 should set the PWM count for FET control to a value obtained by subtracting a count value corresponding to the dead time from the PWM count corresponding to the phase voltage.

In the case where the PWM count for FET control is equal to or more than half the maximum value of the PWM count (equal to or more than 250) in the second system, the on time of the upper FET is shorter than that for a case where the PWM count for FET control is not equal to or more than half the maximum value of the PWM count. Thus, in the embodiment, for convenience of description, it is considered that a current is flowing from the electric motor 18 toward the point of connection between the upper FET and the lower FET (as illustrated in FIG. 10B) in the case where the PWM count for FET control is equal to or more than 250. Therefore, it is considered that the output voltage (phase voltage) is at H level during a dead time period. Thus, in this case, it is considered that the phase voltage is varied as indicated by (g) in FIG. 9, and thus the level variation timing (PWM count corresponding to the phase voltage) of the phase voltage and the switching timing (PWM count for FET control) of the upper FET do not coincide with each other. A PWM count corresponding to the phase voltage at which the switching timing of the upper FET coincides with the level variation timing of the phase voltage has a value obtained by subtracting a count value (in the embodiment, "10") corresponding to the dead time from the PWM count for FET control. Thus, in such a case, it is necessary that the PWM count computation section 47 should set the PWM count for FET control to a value obtained by adding a count value corresponding to the dead time to the PWM count corresponding to the phase voltage.

In the case where the PWM count for FET control is not equal to or more than half the maximum value of the PWM count (not equal to or more than 250) for the second on/off pattern phases, on the other hand, the on time of the upper FETs is longer than that for a case where the PWM count for FET control is equal to or more than half the maximum value of the PWM count. Thus, in the embodiment, for convenience of description, it is considered that a current is flowing from the point of connection between the upper FET and the lower FET toward the electric motor 18 (as illustrated in FIG. 10A) in the case where the PWM count for FET control is not equal to or more than 250. Therefore, it is considered that the output voltage (phase voltage) is at L level during a dead time period. Thus, in this case, it is considered that the phase voltage is varied as indicated by (h) in FIG. 9, and thus the level variation timing (PWM count corresponding to the phase voltage) of the phase voltage and the switching timing (PWM count for FET control) of the upper FET coincide with each other.

In the embodiment, for convenience of description, the direction of the phase current in the first system and the second system is estimated on the basis of whether or not the PWM count is equal to or more than half the maximum value of the PWM count. However, the direction of the phase current may be estimated on the basis of a detected value of the phase current. In step S3, for a PWM count corresponding to the phase voltage that is equal to or more than 250, of the PWM counts $Cu_{1C}$, $Cv_{1C}$, and $Cw_{1C}$ corresponding to phase voltages for each phase in the first system for each PWM cycle Tc in the next current control cycle Ta, the PWM count computation section 47 sets the value of the PWM count, as it is, as the final PWM counts (PWM counts for FET control) $Cu_1$, $Cv_1$, and $Cw_1$ for the relevant phases.

For a PWM count corresponding to the phase voltage that is not equal to or more than 250, of the PWM counts $Cu_{1C}$, $Cv_{1C}$, and $Cw_{1C}$ corresponding to phase voltages for each phase in the first system, the PWM count computation section 47 sets a value obtained by subtracting a count value (in the embodiment, "10") corresponding to the dead time from the value of the PWM count as the final PWM counts (PWM counts for FET control) $Cu_1$, $Cv_1$, and $Cw_1$ for the relevant phases.

For a PWM count that is equal to or more than 250, of the PWM counts $Cu_{2C}$, $Cv_{2C}$, and $Cw_{2C}$ corresponding to phase voltages for each phase in the second system for each PWM cycle Tc in the next current control cycle Ta, the PWM count computation section 47 sets a value obtained by adding a count value (in the embodiment, "10") corresponding to the dead time to the value of the PWM count as the final PWM counts (PWM counts for FET control) $Cu_2$, $Cv_2$, and $Cw_2$ for the relevant phases.

For a PWM count that is not equal to or more than 250, of the PWM counts $Cu_{2C}$, $Cv_{2C}$, and $Cw_{2C}$ corresponding to phase voltages for each phase in the second system, the PWM count computation section 47 sets the value of the PWM count, as it is, as the final PWM counts (PWM counts for FET control) $Cu_2$, $Cv_2$, and $Cw_2$ for the relevant phases.

In the case where the PWM count corresponding to the phase voltage in each PWM cycle for each phase in each system set in steps S1 and S2 is as indicated in FIG. 11A, the PWM count for FET control in each PWM cycle for each phase in each system set in step S3 is as indicated in FIG. 11B. From a comparison between FIGS. 11A and 11B, it is seen that the PWM count $Cv_{1C}$, 200, corresponding to the phase voltage for V-phase in the first system is converted into a PWM count $Cv_1$, 190, for FET control, and that the PWM count $Cw_C$, 100, corresponding to the phase voltage for W-phase in the first system is converted into a PWM count $Cw_1$, 90, for FET control. It is also seen that the PWM count $Cu_{2C}$, 400, corresponding to the phase voltage for U-phase in the second system is converted into a PWM count $Cu_2$, 410, for FET control.

Next, the PWM count computation section 47 provides the first PWM output section 48A with the final U-phase, V-phase, and W-phase PWM counts (PWM counts for FET control) $Cu_1$, $Cv_1$, and $Cw_1$ in the first system for each PWM cycle obtained in step S3 as the U-phase, V-phase, and W-phase PWM counts $Cu_1$, $Cv_1$, and $Cw_1$ in the first system for each PWM cycle Tc in the next current control cycle Ta (step S4).

The PWM count computation section 47 provides the second PWM output section 48B with the final U-phase, V-phase, and W-phase PWM counts (PWM counts for FET control) $Cu_2$, $Cv_2$, and $Cw_2$ in the second system for each PWM cycle obtained in step S3 as the U-phase, V-phase, and W-phase PWM counts $Cu_2$, $Cv_2$, and $Cw_2$ in the second system for each PWM cycle Tc in the next current control cycle Ta (step S5). Then, the PWM count computation section 47 ends the process in the present current control cycle Ta.

Figure 12:
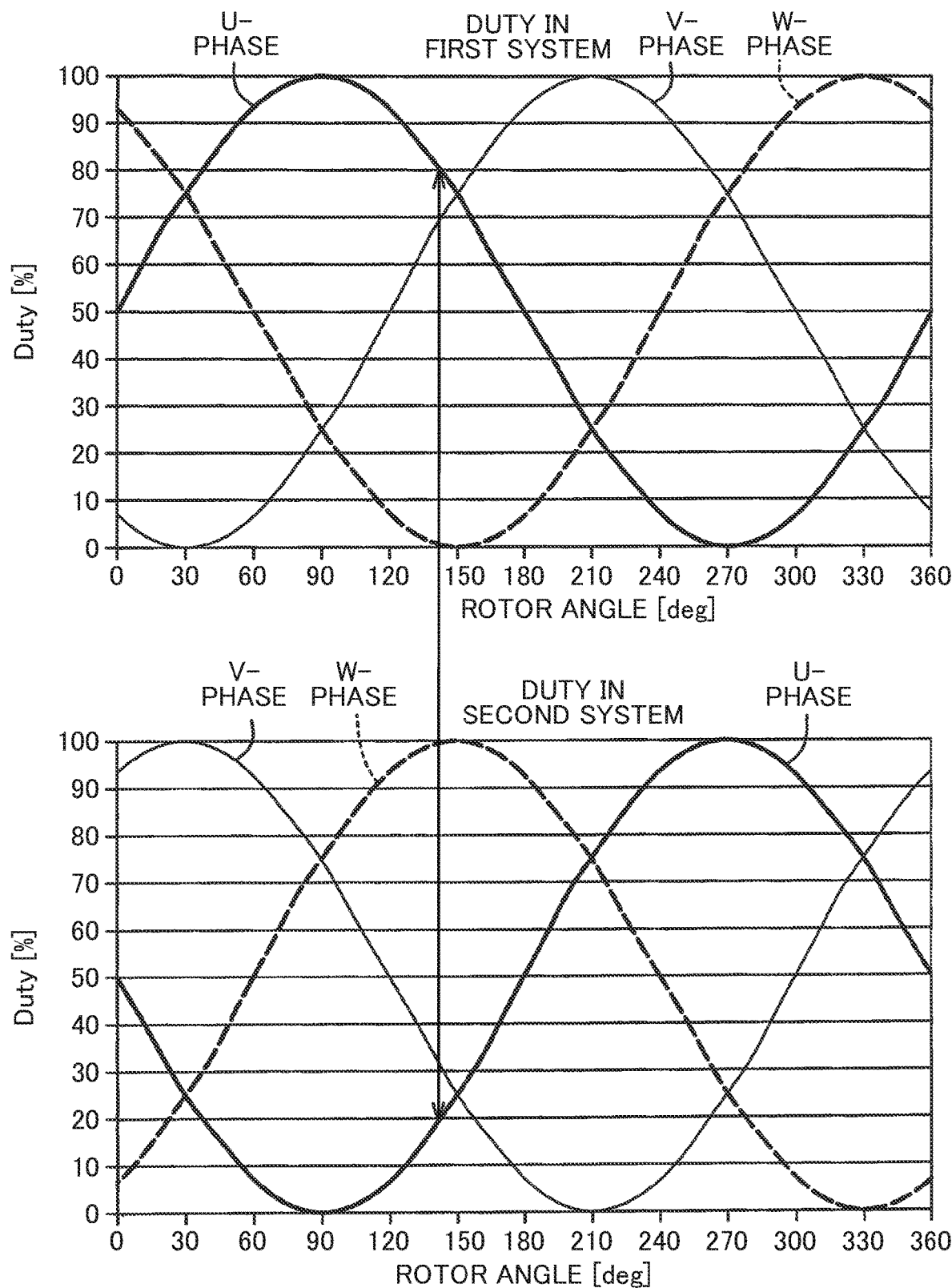
FIG. 12 is a schematic chart illustrating a duty [%] corresponding to PWM counts corresponding to phase voltages for each phase in a first system with respect to a rotor rotational angle and a duty [%] corresponding to PWM counts corresponding to phase voltages for each phase in a second system with respect to the rotor rotational angle.
Figure 13:
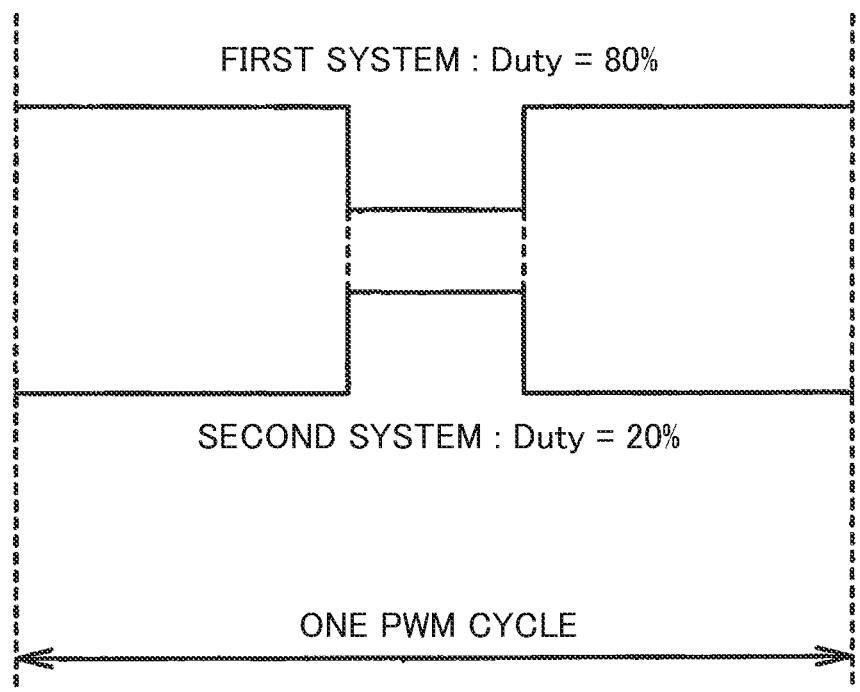
FIG. 13 is a schematic chart illustrating an example in which the waveform of a certain phase voltage in the second system is a waveform obtained by inverting the waveform of a certain phase voltage in the first system in a PWM cycle Tc.

In the embodiment, as discussed earlier, the second three-phase motor coil 18B has a phase difference of 180 degrees with respect to the first three-phase motor coil 18A. Therefore, in the case where the PWM count for FET control for each phase in each system is set as discussed earlier, the duty [%] corresponding to PWM counts corresponding to phase voltages for each phase in the first system with respect to the rotor rotational angle and the duty [%] corresponding to PWM counts corresponding to phase voltages for each phase in the second system with respect to the rotor rotational angle are varied as illustrated in FIG. 12. Thus, as indicated by the double-sided arrow in FIG. 12, when the duty for a certain phase in the first system is 80 [%], for example, the duty for the corresponding phase in the second system is 20 [%], for example. Therefore, as illustrated in FIG. 13, the waveform of the relevant phase voltage in the second system is a waveform obtained by inverting the waveform of the relevant phase voltage in the first system in a PWM cycle Tc. Also for the other phases, similarly, the waveform of a phase voltage in the second system is a waveform obtained by inverting the waveform of the relevant phase voltage in the first system in a PWM cycle Tc. In the embodiment, in this manner, noise currents can be canceled out with each other between the corresponding phases in the two systems, and thus common mode noise can be reduced effectively. Torque applied to the rotor is roughly twice torque applied to the rotor by the three-phase motor coils 18A and 18B in respective systems, and thus the electric motor 18 can be driven efficiently.

In the embodiment discussed earlier, the second three-phase motor coil 18B has a phase difference of 180 degrees with respect to the first three-phase motor coil 18A. However, the second three-phase motor coil 18B may have a phase difference of 300 degrees with respect to the first three-phase motor coil 18A. In this case, operation of the three-phase current computation section 49 and the PWM count computation section 47 can be changed as follows so that common mode noise can be reduced effectively and the electric motor 18 can be driven efficiently.

That is, the three-phase current computation section 49 computes the phase currents Iu, Iv, and Iw for U-phase, V-phase, and W-phase for current control on the basis of the following formula (4).

$$Iu = Iu_1 - Iv_2$$

$$Iv = Iv_1 - Iw_2$$

$$Iw = Iw_1 - Iu_2 \quad (4)$$

The PWM count computation section 47 sets a PWM count for FET control for each phase in each system such that a current that flows through a stray capacitance because of phase voltages for U-phase, V-phase, and W-phase in the first system is canceled out with a current that flows through the stray capacitance because of phase voltages for V-phase, W-phase, and U-phase, respectively, in the second system in each PWM cycle. Specifically, in step S1 in FIG. 8, the PWM count computation section 47 performs a process that is similar to that performed in step S1 discussed earlier. That is, the PWM count computation section 47 sets the PWM counts $Cu_{1A}$, $Cv_{1A}$, and $Cw_{1A}$ for U-phase, V-phase, and W-phase in the first system for the next current control cycle Ta, which are provided from the PWM duty computation section 46, as the PWM counts (in the example, PWM counts corresponding to phase voltages) $Cu_{1C}$, $Cv_{1C}$, and $Cw_{1C}$ for U-phase, V-phase, and W-phase, respectively, in the first system for each PWM cycle Tc in the next current control cycle Ta.

In step S2 in FIG. 8, however, the PWM count computation section 47 performs a process that is different from that performed in step S2 discussed earlier. That is, the PWM count computation section 47 sets the PWM counts $Cu_{1A}$, $Cv_{1A}$, and $Cw_{1A}$ corresponding to phase voltages for U-phase, V-phase, and W-phase in the first system for the next current control cycle Ta, which are provided from the PWM duty computation section 46, as the PWM counts (in the example, PWM counts corresponding to phase voltages) $Cv_{2C}$, $Cw_{2C}$, and $Cu_{2C}$ for V-phase, W-phase, and U-phase, respectively, in the second system for each PWM cycle Tc in the next current control cycle Ta. The processes in steps S3 to S5 are similar.

Alternatively, the second three-phase motor coil 18B may have a phase difference of 60 degrees with respect to the first three-phase motor coil 18A. In this case, operation of the three-phase current computation section 49 and the PWM count computation section 47 can be changed as follows so that common mode noise can be reduced effectively and the electric motor 18 can be driven efficiently. That is, the three-phase current computation section 49 computes the phase currents Iu, Iv, and Iw for U-phase, V-phase, and W-phase for current control on the basis of the following formula (5).

$$Iu=Iu_1-Iw_2$$

$$Iv=Iv_1-Iu_2$$

$$Iw=Iw_1-Iv_2 \qquad (5)$$

The PWM count computation section 47 sets a PWM count for FET control for each phase in each system such that a current that flows through a stray capacitance because of phase voltages for U-phase, V-phase, and W-phase in the first system is canceled out with a current that flows through the stray capacitance because of phase voltages for W-phase, U-phase, and V-phase, respectively, in the second system in each PWM cycle. Specifically, in step S1 in FIG. 8, the PWM count computation section 47 performs a process that is similar to that performed in step S1 discussed earlier. That is, the PWM count computation section 47 sets the PWM counts $Cu_{1A}$, $Cv_{1A}$, and $Cw_{1A}$ for U-phase, V-phase, and W-phase in the first system for the next current control cycle Ta, which are provided from the PWM duty computation section 46, as the PWM counts (in the example, PWM counts corresponding to phase voltages) $Cu_{1C}$, $Cv_{1C}$, and $Cw_{1C}$ for U-phase, V-phase, and W-phase, respectively, in the first system for each PWM cycle Tc in the next current control cycle Ta.

In step S2 in FIG. 8, however, the PWM count computation section 47 performs a process that is different from that performed in step S2 discussed earlier. That is, the PWM count computation section 47 sets the PWM counts $Cu_{1A}$, $Cv_{1A}$, and $Cw_{1A}$ for U-phase, V-phase, and W-phase in the first system for the next current control cycle Ta, which are provided from the PWM duty computation section 46, as the PWM counts (in the example, PWM counts corresponding to phase voltages) $Cw_{2C}$, $Cu_{2C}$, and $Cv_{2C}$ for W-phase, U-phase, and V-phase, respectively, in the second system for each PWM cycle Tc in the next current control cycle Ta. The processes in steps S3 to S5 are similar.

In the embodiment described above, the PWM counts $Cu_{1C}$, $Cv_{1C}$, and $Cw_{1C}$ for U-phase, V-phase, and W-phase in the first system, which are set in step S1 in FIG. 8, are treated as PWM counts corresponding to phase voltages for the corresponding phases in the first system. The PWM counts $Cu_{2C}$, $Cv_{2C}$, and $Cw_{2C}$ for U-phase, V-phase, and W-phase in the second system, which are set in step S2, are treated as PWM counts corresponding to phase voltages for the corresponding phases in the second system.

In the case where the dead time is set to a very short time, however, the PWM counts $Cu_{1C}$, $Cv_{1C}$, and $Cw_{1C}$ set in step S1 in FIG. 8 and the PWM counts $Cu_{2C}$, $Cv_{2C}$, and $Cw_{2C}$ set in step S2 may be treated as follows. That is, the PWM counts $Cu_{1C}$, $Cv_{1C}$, and $Cw_{1C}$ which are set in step S1 in FIG. 8 are treated as the final PWM counts (PWM counts for FET control) $Cu_1$, $Cv_1$, and $Cw_1$ for U-phase, V-phase, and W-phase in the first system. The PWM counts $Cu_{2C}$, $Cv_{2C}$, and $Cw_{2C}$ in the first system which are set in step S2 in FIG. 8 are treated as the final PWM counts (PWM counts for FET control) $Cu_2$, $Cv_2$, and $Cw_2$ for U-phase, V-phase, and W-phase in the second system.

In this case, step S3 in FIG. 8 is omitted. In step S4 in FIG. 8, the first PWM output section 48A is provided with the PWM counts $Cu_{1C}$, $Cv_{1C}$, and $Cw_{1C}$ which are set in step S1 in FIG. 8 as PWM counts for FET control. In step S5 in FIG. 8, the second PWM output section 48B is provided with the PWM counts $Cu_{2C}$, $Cv_{2C}$, and $Cw_{2C}$ which are set in step S2 in FIG. 8 as PWM counts for FET control.

In the case where a failure occurs in one of the two systems, current command values for one normal system may be doubled. In the embodiment, the present invention is applied to a motor control device for an electric power steering system. However, the present invention is also applicable to a motor control device that is used for devices other than an electric power steering system.

Besides, a variety of design changes may be made without departing from the scope defined in the claims.

What is claimed is:

1. A motor control device that controls an electric motor that has three-phase motor coils in two systems with a phase difference of 60 degrees, 180 degrees, or 300 degrees between the two systems via a first drive circuit that drives three-phase motor coils in a first system, which is one of the two systems, and a second drive circuit that drives three-phase motor coils in a second system, which is the other system, the first drive circuit and the second drive circuit each having sets of upper and lower switching elements for three phases, the motor control device comprising:

a setting unit that sets a two-phase current command value corresponding to a target current value for a current that is to flow through the electric motor;

an actual current value computation unit that computes an actual two-phase current value that matches a current that flows through the electric motor;

a first PWM count computation unit that computes a first PWM count for each of three phases in the first system in each PWM cycle on the basis of the two-phase current command value and the actual two-phase current value; and a second PWM count computation unit that computes a second PWM count for each of three phases in the second system in each PWM cycle in accordance with the phase difference on the basis of the first PWM count for each of the three phases in the first system, wherein the upper and lower switching elements for each phase in one of the first system and the second system are controlled in accordance with a first pattern in which the upper and lower switching elements are varied in an order of an upper on state, a lower on state, and the upper on state from a time of start of PWM cycles, and the upper and lower switching elements for each phase in the other system are controlled in accordance with a second pattern in which the upper and lower switching elements are varied in an order of a lower on state, an upper on state, and the lower on state from a time of start of PWM cycles.

2. The motor control device according to claim 1, wherein:

the phase difference between the three-phase motor coils in the first system and the three-phase motor coils in the second system is 180 degrees;

the actual current value computation unit includes a three-phase current computation unit that computes a total U-phase current on the basis of a U-phase current that flows through the three-phase motor coils in the first system and a U-phase current that flows through the three-phase motor coils in the second system, a total V-phase current on the basis of a V-phase current that flows through the three-phase motor coils in the first system and a V-phase current that flows through the three-phase motor coils in the second system, and a total W-phase current on the basis of a W-phase current that flows through the three-phase motor coils in the first system and a W-phase current that flows through the three-phase motor coils in the second system, and a three-phase/two-phase conversion unit that computes the actual two-phase current value by performing a three-phase/two-phase conversion on three-phase currents that include the total U-phase current, the total V-phase current, and the total W-phase current which are computed by the three-phase current computation unit; and the second PWM count computation unit is configured to compute the first PWM counts for U-phase, V-phase, and W-phase in the first system as the second PWM counts for U-phase, V-phase, and W-phase in the second system.

3. The motor control device according to claim 1, wherein:

the phase difference between the three-phase motor coils in the first system and the three-phase motor coils in the second system is 300 degrees;

the actual current value computation unit includes a three-phase current computation unit that computes a total U-phase current on the basis of a U-phase current that flows through the three-phase motor coils in the first system and a V-phase current that flows through the three-phase motor coils in the second system, a total V-phase current on the basis of a V-phase current that flows through the three-phase motor coils in the first system and a W-phase current that flows through the three-phase motor coils in the second system, and a total W-phase current on the basis of a W-phase current that flows through the three-phase motor coils in the first system and a U-phase current that flows through the three-phase motor coils in the second system, and a three-phase/two-phase conversion unit that computes the actual two-phase current value by performing a three-phase/two-phase conversion on three-phase currents that include the total U-phase current, the total V-phase current, and the total W-phase current which are computed by the three-phase current computation unit; and the second PWM count computation unit is configured to compute the first PWM counts for U-phase, V-phase, and W-phase in the first system as the second PWM counts for V-phase, W-phase, and U-phase in the second system.

4. The motor control device according to claim 1, wherein:

the phase difference between the three-phase motor coils in the first system and the three-phase motor coils in the second system is 60 degrees;

the actual current value computation unit includes a three-phase current computation unit that computes a total U-phase current on the basis of a U-phase current that flows through the three-phase motor coils in the first system and a W-phase current that flows through the three-phase motor coils in the second system, a total V-phase current on the basis of a V-phase current that flows through the three-phase motor coils in the first system and a U-phase current that flows through the three-phase motor coils in the second system, and a total W-phase current on the basis of a W-phase current that flows through the three-phase motor coils in the first system and a V-phase current that flows through the three-phase motor coils in the second system, and a three-phase/two-phase conversion unit that computes the actual two-phase current value by performing a three-phase/two-phase conversion on three-phase currents that include the total U-phase current, the total V-phase current, and the total W-phase current which are computed by the three-phase current computation unit; and the second PWM count computation unit is configured to compute the first PWM counts for U-phase, V-phase, and W-phase in the first system as the second PWM counts for W-phase, U-phase, and V-phase in the second system.

5. The motor control device according to claim 1, wherein:

the first PWM count for each phase in the first system is a PWM count for control for controlling the upper and lower switching elements for the corresponding phase in the first system; and the second PWM count for each phase in the second system is a PWM count for control for controlling the upper and lower switching elements for the corresponding phase in the second system.

6. The motor control device according to claim 1, wherein:

the first PWM count for each phase in the first system is a PWM count corresponding to a phase voltage that is a target value for a PWM count corresponding to a level variation timing of a phase voltage for the corresponding phase in the first system;

the second PWM count for each phase in the second system is a PWM count corresponding to a phase voltage that is a target value for a PWM count corresponding to a level variation timing of a phase voltage for the corresponding phase in the second system; and the motor control device further includes a third PWM count computation unit that computes a PWM count for switching element control for each phase in the first system such that the level variation timing of the phase voltage for each phase in the first system is a timing that matches the first PWM count for that phase, and that computes a PWM count for switching element control for each phase in the second system such that the level variation timing of the phase voltage for each phase in the second system is a timing that matches the second PWM count for that phase.

* * * * *